US012792870B2

(12) United States Patent
Jiao et al.

(10) Patent No.: US 12,792,870 B2
(45) Date of Patent: Nov. 10, 2026

(54) PROCESSOR, AND METHOD FOR GENERATING BINARIZED WEIGHTS FOR A NEURAL NETWORK

(71) Applicant: United Microelectronics Center Co., Ltd, Chongqing (CN)

(72) Inventors: Yuzhong Jiao, Hong Kong (HK); Xiao Huo, Hong Kong (HK); Yuan Lei, Hong Kong (HK)

(73) Assignee: United Microelectronics Center Co., Ltd, Chongqing (CN)

( * ) Notice: Subject to any disclaimer, the term of this patent is extended or adjusted under 35 U.S.C. 154(b) by 1292 days.

(21) Appl. No.: 17/524,968

(22) Filed: Nov. 12, 2021

(65) Prior Publication Data

US 2022/0147792 A1 May 12, 2022

(30) Foreign Application Priority Data

Nov. 12, 2020 (CN) ......................... 202011262740.4
Dec. 11, 2020 (CN) ......................... 202011457687.3

(51) Int. Cl.
*G06F 18/10* (2023.01)
*G06F 18/21* (2023.01)
(Continued)

(52) U.S. Cl.
CPC ............... *G06N 3/04* (2013.01); *G06F 18/10* (2023.01); *G06F 18/211* (2023.01); *G06F 18/2163* (2023.01); *G06N 3/0495* (2023.01)

(58) Field of Classification Search
CPC .......... G06N 3/04; G06N 3/045; G06N 3/047; G06N 3/08; G06N 3/0495; G06F 18/10;
(Continued)

(56) References Cited

U.S. PATENT DOCUMENTS

| | | | |
|---|---|---|---|
| 10,311,342 B1 | 6/2019 | Farhadi et al. |
| 10,819,369 B2 | 10/2020 | Arelakis et al. |
| 2020/0344467 A1 | 10/2020 | Murra et al. |

FOREIGN PATENT DOCUMENTS

CN 109212960 A 1/2019

OTHER PUBLICATIONS

Chou, Philip A., Tom Lookabaugh, and Robert M. Gray. "Entropy-constrained vector quantization." IEEE Transactions on acoustics, speech, and signal processing 37.1 (2002): 31-42. (Year: 1989).*

(Continued)

*Primary Examiner* — Beau D Spratt
*Assistant Examiner* — Megan Elizabeth Hwang
(74) *Attorney, Agent, or Firm* — IPRTOP LLC

(57) ABSTRACT

A processor for generating binarized weights for a neural network. The processor comprises a binarization scheme generation module configured to generate, for a group of weights taken from a set of input weights for one or more layers of a neural network, one or more potential binary weight strings representing said group of weights; a binarization scheme selection module configured to select a binary weight string to represent said group of weights, from among the one or more potential binary weight strings, based at least in part on a number of data bits required to represent the one or more potential binary weight strings according to a predetermined encoding method; and a weight generation module configured to output data representing the selected binary weight string for representing the group of weights.

15 Claims, 18 Drawing Sheets

(51) Int. Cl.
*G06F 18/211* (2023.01)
*G06N 3/04* (2023.01)
*G06N 3/0495* (2023.01)

(58) Field of Classification Search
CPC ... G06F 18/211; G06F 18/2163; G06V 10/94; G06V 10/82
See application file for complete search history.

(56) References Cited

OTHER PUBLICATIONS

Ott, Joachim, et al. "Recurrent neural networks with limited numerical precision." arXiv preprint arXiv:1608.06902 (2016). (Year: 2016).*
Tallini, Luca G., and Bella Bose. "Design of balanced and constant weight codes for VLSI systems." IEEE transactions on computers 47.5 (2002): 556-572. (Year: 2002).*
Skachek, Vitaly, and Kees A. Schouhamer Immink. "Constant weight codes: An approach based on Knuth's balancing method." IEEE Journal on Selected Areas in Communications 32.5 (2014): 909-918. (Year: 2014).*
Han, Song, Huizi Mao, and William J. Dally. "Deep compression: Compressing deep neural networks with pruning, trained quantization and huffman coding." arXiv preprint arXiv:1510.00149 (2015). (Year: 2015).*
Lin, Xiaofan, Cong Zhao, and Wei Pan. "Towards accurate binary convolutional neural network." Advances in neural information processing systems 30 (2017). (Year: 2017).*
Wiedemann, Simon, et al. "DeepCABAC: Context-adaptive binary arithmetic coding for deep neural network compression." arXiv preprint arXiv:1905.08318 (2019). (Year: 2019).*
Yixing Li et al., "BNN Pruning: Pruning Binary Neural Network Guided by Weight Flipping Frequency," 21st International Symposium on Quality Electronic Design 2020, 5 pages.
Shixuan Zheng et al., "An Ultra-Low Power Binarized Convolutional Neural Network-Based Speech Recognition Processor With On-Chip Self-Learning," IEEE Transactions on Circuits and Systems 2019, Downloaded on Nov. 15, 2020, 14 pages.

* cited by examiner

1002 Floating point weight

| | | |
|---|---|---|
| 0.044146 | -0.081239 | -0.049544 |
| 0.131703 | 0.001276 | -0.124038 |
| -0.051474 | 0.047386 | 0.031079 |

1004 Normalised weight

| | | |
|---|---|---|
| 0.049051 | -0.090265 | -0.055049 |
| 0.150189 | 0.001417 | -0.137820 |
| -0.057193 | 0.052650 | -0.034531 |

1006 Probability (+1)

| | | |
|---|---|---|
| 0.620227 | 0.288506 | 0.365750 |
| 0.817856 | 0.503544 | 0.201296 |
| 0.360791 | 0.628660 | 0.585482 |

1008 Probability (-1)

| | | |
|---|---|---|
| 0.379772 | 0.711490 | 0.634249 |
| 0.181430 | 0.496450 | 0.798703 |
| 0.639208 | 0.371330 | 0.414517 |

1010

| | | |
|---|---|---|
| 1 (62%) | -1 (71%) | -1 (63%) |
| 1 (81%) | 1 (50%) | -1 (80%) |
| -1 (64%) | 1 (63%) | 1 (59%) |

1012

| | | |
|---|---|---|
| 1 (62%) | -1 (71%) | -1 (63%) |
| 1 (81%) | 1 (50%) | -1 (80%) |
| -1 (64%) | 1 (63%) | 1 (59%) |

1014

| | | |
|---|---|---|
| 1 | -1 | -1 |
| 1 | 1 | -1 |
| -1 | 1 | 1 |

1016

| | | |
|---|---|---|
| 1 | -1 | -1 |
| 1 | -1 | -1 |
| -1 | 1 | 1 |

Fig. 10

| | | |
|---|---|---|
| 1 | -1 | -1 |
| 1 | 1 | -1 |
| -1 | 1 | 1 |

1102'

| | | |
|---|---|---|
| 0.603341 | 0.757465 | 0.625445 |
| 0.909956 | 0.500101 | 0.887684 |
| 0.633529 | 0.616504 | 0.555185 |

Matrix probability: 0.025038
Encoding bits: 11 bits

| | | | |
|---|---|---|---|
| 11 | 100 | 110 | 011 |

1104

| | | |
|---|---|---|
| 1 | -1 | -1 |
| 1 | -1 | -1 |
| -1 | 1 | 1 |

1104'

| | | |
|---|---|---|
| 0.603341 | 0.757465 | 0.625445 |
| 0.909956 | 0.499899 | 0.887684 |
| 0.633529 | 0.616504 | 0.555185 |

Matrix probability: 0.025027
Encoding bits: 8 bits

| | | |
|---|---|---|
| 01 | 100 | 011 |

1106

| | | |
|---|---|---|
| 1 | -1 | -1 |
| 1 | 1 | -1 |
| -1 | 1 | -1 |

1106'

| | | |
|---|---|---|
| 0.603341 | 0.757465 | 0.625445 |
| 0.909956 | 0.500101 | 0.887684 |
| 0.633529 | 0.616504 | 0.444815 |

Matrix probability: 0.020060
Encoding bits: 11 bits

| | | | |
|---|---|---|---|
| 11 | 100 | 110 | 010 |

1108

| | | |
|---|---|---|
| 1 | -1 | -1 |
| 1 | -1 | -1 |
| -1 | 1 | -1 |

1108'

| | | |
|---|---|---|
| 0.603341 | 0.757465 | 0.625445 |
| 0.909956 | 0.499899 | 0.887684 |
| 0.633529 | 0.616504 | 0.444815 |

Matrix probability: 0.020052
Encoding bits: 8 bits

| | | |
|---|---|---|
| 01 | 100 | 010 |

PROCESSOR, AND METHOD FOR GENERATING BINARIZED WEIGHTS FOR A NEURAL NETWORK

CROSS-REFERENCE TO RELATED APPLICATIONS

This application claims priority to Chinese Patent Application Serial No. 202011262740.4, filed Nov. 12, 2020, and Chinese Patent Application Serial No. 202011457687.3, filed Dec. 11, 2020, all of which are incorporated herein by reference.

BACKGROUND

The present disclosure relates to a processor and method for generating binarized weights for a neural network.

Different neural network architectures have been developed for different applications. For neural networks using the same architecture, networks with more layers and more parameters will typically achieve greater accuracy in the tasks that the neural network perform. For example, a convolutional neural network (CNN) based on VCG-16 (with 16 layers, 138 million parameters) can generally achieve better accuracy than a CNN based on AlexNet (with 8 layers and 60 million parameters), which in turn can generally achieve better accuracy than a CNN based on LeNet-5 (with 5 layers and 60,000 parameters). The same principle applies to more modern architectures such as ResNet and DenseNet.

A problem with neural networks, particularly for convolutional neural networks, is that the operations that these networks perform will often consume a significant amount of hardware resources, which hinders such networks to be applied in resource constrained environments (e.g. small-sized, battery-powered devices). For example, multiply-accumulation (MAC) operations performed on floating point weights in a convolution layer can require significant data processing and memory resources. Significant memory resources are also required to store the weights in each convolution or fully connected layer of the neural network. However, there are often physical or practical limitations to the amount of such hardware resources available for implementing a neural network depending on its implementation environment.

Several approaches have been proposed to help reduce the hardware resources required by a neural network. Such approaches include, for example, pruning connections in the network based on weight magnitude, and quantising weights from an original floating point value (e.g. 10 to 64 bits in length) to a fixed point value of predetermined bit length (e.g. 16 bits, 8 bits, 4 bits, 2 bits or 1 bit in length). Another approach is the development of a binary neural network (BNN) architecture, which uses binarized weights to process binarized data input. Operations in a BNN are typically easier to realise in hardware, where for example, instead of performing MAC operations on binary weights, a simpler exclusive-NOR (XNOR) logical operation can be performed on the relevant binary weights.

Several approaches have been proposed to reduce the resource requirements of BNNs. For example, a flip frequency of each weight can be determined, where weights with a flip frequency higher than a defined threshold (and therefore have limited impact on the output produced by the BNN) can be pruned. In another example, binary convolutional neural network (BCNN) weight matrices can be pruned and then compressed. Non-zero bits in a binary weight matrix are incrementally pruned (or changed) into zero bits, starting from one end of the weight matrix, and stops when a change to the binary weight matrix causes the significantly large decrease in recognition accuracy. Continuous sequences of weights of the same value in the weight matrix can then be compressed (e.g. mapped to predefined values representing sequences of consecutive zero bits of different length). In yet another example, a sensitivity of each weight in a BNN can be estimated and then divided into a sensitive and non-sensitive weights based on a threshold. The threshold is determined based on an error in the BNN caused by changes to the values of non-sensitive binarized weights stored in non-reliable memory operating at near/sub-threshold voltage, and is adjusted to achieve an optimised set of non-sensitive weights.

In the above approaches, a binary weight matrix is generated and then processed separately to achieve compression. Such matrices are generated without taking compression characteristics of the resulting matrix into account. Furthermore, in the above approaches, weights matrices can only contain one of two binary values. These approaches do not take into account the possibility to consider slight variations of a given binary weight matrix (when taking the probability associated with each weight into account), where some of these variations can be more favourably compressed than others.

The present disclosure aims to address one or more of the above problems. In particular, representative embodiments of the present disclosure aim to provide an improved way of generating a binary weight matrix with favourable compression characteristics by taking probabilities of input weights into account.

SUMMARY DISCLOSURE

According to a first aspect of the present disclosure, there is provided a processor for generating binarized weights for a neural network, wherein the processor comprises:

- a binarization scheme generation module configured to generate, for a group of weights taken from a set of input weights for one or more layers of a neural network, one or more potential binary weight strings representing said group of weights;
- a binarization scheme selection module configured to select a binary weight string to represent said group of weights, from among the one or more potential binary weight strings, based at least in part on a number of data bits required to represent the one or more potential binary weight strings according to a predetermined encoding method; and
- a weight generation module configured to output data representing the selected binary weight string for representing the group of weights.

By way of non-limiting example, the potential binary weight strings may be generated based on thresholds applied to the input weights or based on probabilities of each weight being associated with a particular binary value. In some examples, each input weight is determined to correspond to a first binary value, a second binary value or to be an ambiguous weight which may correspond to either of the first and second binary values.

According to a second aspect of the present disclosure, there is provided a processor according to claim 1.

According to a third aspect of the present disclosure, there is provided a method according to claim 15.

According to a fourth aspect of the present disclosure, there is provided a processing unit.

According to a fifth aspect of the present disclosure, there is provided a processor for a neural network, comprising:

a weight probability analysis module configured to generate, based on a set of input weights for one or more layers of a neural network, at least data representing a probability of each said input weight in a set of input weights being associated with a binary value;

a binarization scheme generation module configured to generate, for at least one selected group of said weights, at least data representing one or more potential binary weight matrices based on the probability determined for the selected said weights;

a binarization scheme selection module configured to at least: generate data representing a matrix-specific probability value for each said potential binary weight matrix, generate data representing a number of data bits for representing each said potential binary weight matrix according to a predetermined encoding method, and perform selection on said potential binary weight matrices based on said matrix-specific probability value and said number of data bits; and a weight generation module configured to generate data representing one or more binary weights according to said selected potential binary weight matrix.

Preferably, the processor is configured to transform said input weights into corresponding weight values within a predetermined weight range, and use said corresponding weight values as input weights.

Preferably, the weight probability analysis module is further configured to generate said data representing a said probability for each said input weight based on: a predetermined relationship between different potential values of said input weight and a corresponding probability; one or more previously determined probabilities for a weight corresponding to said input weight; or one or more previously determined weight values for a weight corresponding to said input weight. Preferably, the previously determined probabilities for a weight and/or said previously determined weight values for a weight are determined based on training events performed by a neural network.

Preferably, the processor is configured to select said group of weights based on predetermined selection criteria.

According to a sixth aspect of the present disclosure, there is provided a method for binary quantisation of weights in a neural network, comprising:

Generating, based on a set of input weights for one or more layers of a neural network, at least data representing a probability of each said input weight in a set of input weights being associated with a binary value;

generating, for at least one selected group of said weights, at least data representing one or more potential binary weight matrices based on the probability determined for the selected said weights;

generating data representing a matrix-specific probability value for each said potential binary weight matrix, generating data representing a number of data bits for representing each said potential binary weight matrix according to a predetermined encoding method, and performing selection on said potential binary weight matrices based on said matrix-specific probability value and said number of data bits; and generating data representing one or more binary weights according to said selected potential binary weight matrix.

Preferably, the method further includes transforming said input weights into corresponding weight values within a predetermined weight range, and using said corresponding weight values as input weights.

Preferably, said set of input weights comprise: some of said input weights selected from at least one said layer; some of said input weights selected from all said layers; all said input weights for at least one said layer; or all said input weights for all said layers.

Preferably, the method further includes generating said data representing a said probability for each said input weight based on: a predetermined relationship between different potential values of said input weight and a corresponding probability; one or more previously determined probabilities for a weight corresponding to said input weight; or one or more previously determined weight values for a weight corresponding to said input weight. Said previously determined probabilities for a weight and/or said previously determined weight values for a weight are determined based on training events performed by a neural network.

Preferably, the method further includes selecting said group of weights based on predetermined selection criteria. Preferably said predetermined selection criteria includes at least one of the following: one or more weights from a selected row of a kernel of a convolutional layer; one or more weights from a selected column of a kernel of a convolutional layer; one or more weights from different kernels associated with the same channel of a convolutional layer; one or more weights from different kernels of different channels associated with the same filter of a convolutional layer; one or more input weights for a fully-connected layer; and one or more output weights for a fully-connected layer.

Preferably, the method further includes determining a binary weight value for each said input weight based on a comparison of said data representing a probability of said input weight with a predetermined probability threshold. Based on said comparison, an input weight is determined to be: associated with a first binary value; associated with a second binary value; or associated with either said first or second binary value. Preferably, the method further includes generating a number of said potential binary weight matrices based on a number of said input weights determined to be associated with either said first or second binary value, where each said potential binary weight matrix comprises a different combination of weight values.

Preferably, said encoding method is at least one of a general Run Length Encoding and a general Huffman coding.

BRIEF DESCRIPTION OF THE DRAWINGS

Representative embodiments disclosure are herein described, by way of example only, with reference to the accompanying drawings, where like numbers refer to the like features, wherein:

FIG. 10 is a diagrammatic example of a method for generating potential binary weight matrices according to a representative embodiment of the present disclosure;

DETAILED DESCRIPTION

In this application, unless specified otherwise, the terms "comprising", "comprise", and grammatical variants thereof, intended to represent open or inclusive language such that they include the recited elements but also permit inclusion of additional, non-explicitly recited elements. The term "includes" means includes but not limited to, and the term "including" means including but not limited thereto. The term "based on" means based at least in part on. The term "number" means any natural number equal to or greater than one. The terms "a" and "an" are intended to denote at least one of a particular element.

For ease of reference the description is split into three parts, in which examples are described with reference to the accompanying drawings.

Part 1 refers to FIGS. 1A to 3 and describes in a method, processor and system for generating binarized weights for a neural network in which selection of binary weight strings to represent the weights is based, at least in part, on encoding lengths of the selected binary weight strings.

Part 2 refers to FIGS. 4A to 13 and draws on the principles disclosed in Part 1, but describes in detail particular implementations, in which selection of binary weight strings (referred to in Part 2 as "binary weight matrices") is based both on encoding lengths of the binary weight stings and global probability values (also referred to as "specific probability values") of the binary strings.

Part 3 refers to FIGS. 14 to 20 and draws on the principles disclosed in Part 1, but describes in detail particular implementations in which the encoding lengths are determined based on an encoding method which uses a plurality of different encoding schemes.

The teachings and features disclosed in any of Parts 1, 2 or 3 may be combined together, in part or in whole, except where it is explicitly indicated that this is not the case, or where common sense and logic dictate otherwise. Thus, for example it is possible to have a system which uses global probability values (as disclosed in Part 2) and an encoding method which uses a plurality of encoding schemes (as disclosed in Part 3). In another example, it is possible to have a system which determines local probability values for individual weights (as taught in Part 2) and which uses an encoding method which uses a plurality of encoding schemes (as taught in Part 3), but which does not use global probability values (as taught in Part 2).

Figure 1A:
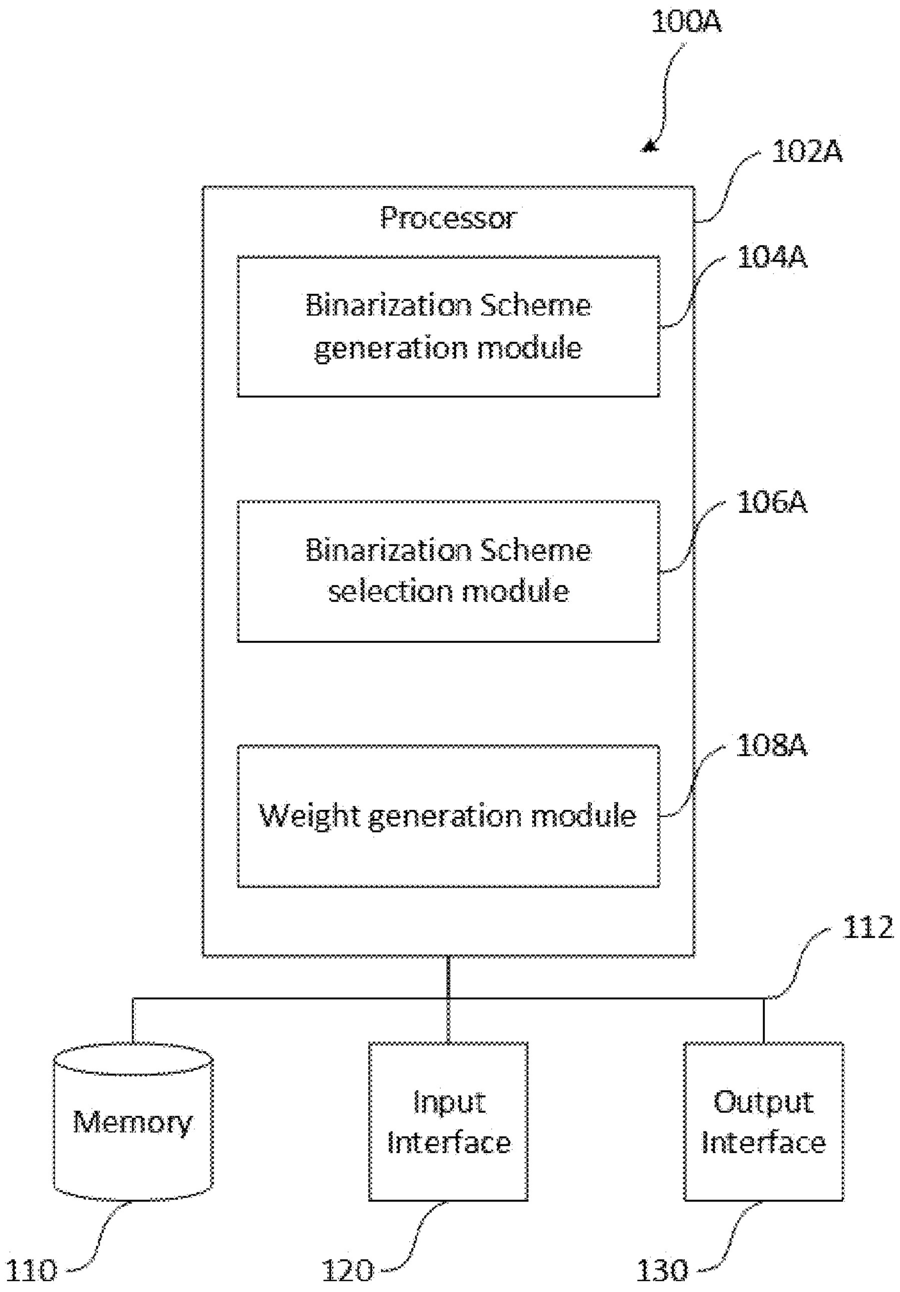
FIG. 1A is a block diagram of an exemplary internal structure of a data processing system suitable for implementing the methods of the present disclosure.

Part 1—Generation and Selection of Potential Binary Weight Strings to Represent Groups of Weights in a Neural Network FIG. 1A is a block diagram illustrating an exemplary internal structure of a data processing system 100A, which includes a processor 102A, memory 110, one or more input interfaces 120, and one or more output interfaces 130. These elements may communicate each other by any suitable means, such as but not limited to a data communications bus 112. The bus 112 may for example include one or more conductors for the components of the computer to communicate (e.g. send or exchange data) with each other.

The processor 102A may include one or more microprocessors, microcontrollers, or similar or equivalent data/signal processing components (e.g. an Application Specific Integrated Circuit (ASIC) or Field-Programmable Gate Array (FGPA)) configured to interpret and execute instructions (including in the form of code or signals) provided to the processor 102A. The memory 110 may include any conventional random access memory (RAM) device, any conventional read-only memory (ROM) device, or any another type of volatile or non-volatile data storage device that can store information and instructions for execution by the processor 102A. The memory 110 may also include a storage device (not shown in FIG. 1A) for persistent storage of electronic data (e.g. a hard drive), including for example a magnetic, optical or circuit-based data recording medium and any related circuitry and physical components for reading and writing data to/from the recording medium.

The input interface 120 may include one or more conventional data communication means for receiving: (i) input data representing weights for a neural network; (ii) configuration data representing one or more parameters for controlling the operation of the system 100A; and/or (iii) instruction data representing instruction code (e.g. to be stored in memory 110) for controlling the operation of the system 100A. The output interface 130 may include one or more conventional data communication means for providing output data to an external system or user, including for example, binary weight data representing one or more binary weights generated by the system 100A.

In some examples of the present disclosure, the system 100A may be implemented in an integrated circuit chip, such as an ASIC or FPGA. In other examples, the system 100A can be implemented on a conventional desktop, server or cloud-based computer system. While the memory 110, input interface 120 and output interface 130 are shown as separate elements in FIG. 1A, in some examples any or all of these elements may be integrated into the processor 102A.

Figure 2:
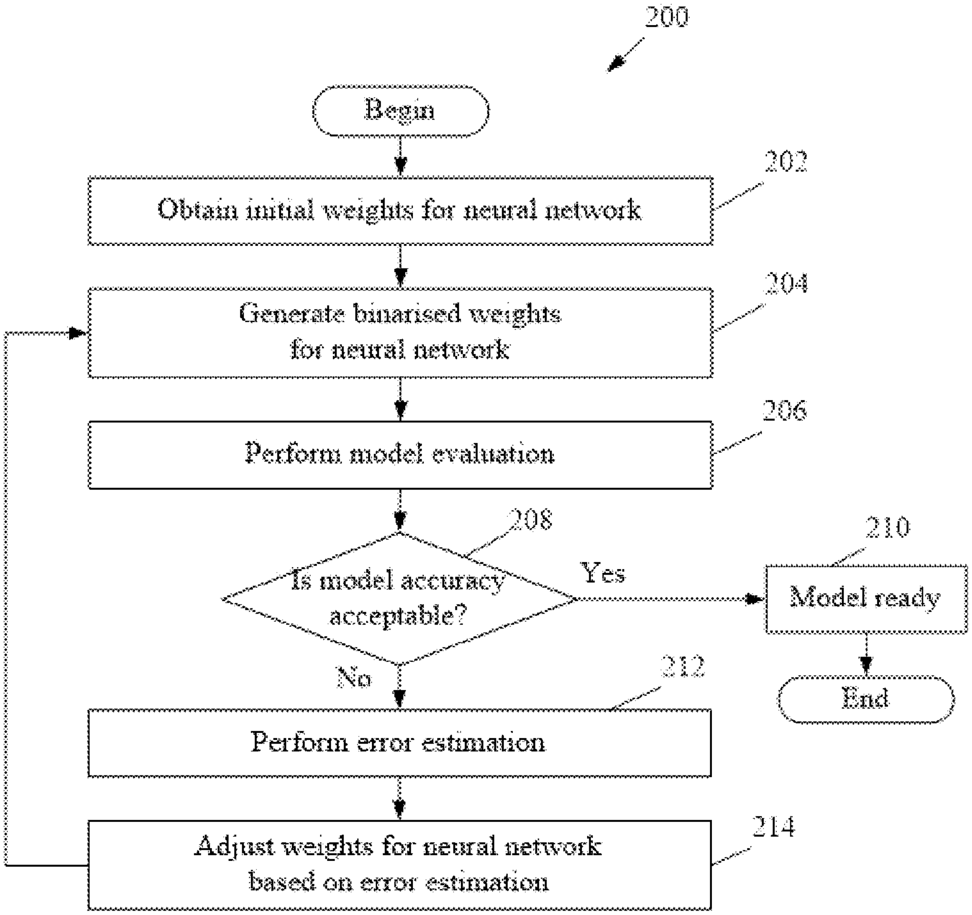
FIG. 2 is an exemplary flow diagram of a training process for generating binary weights using the methods of the present disclosure.

The processor 102A of the system 100A is configured to provide a binarization scheme generation module 104A, binarization scheme selection module 106A and weight generation module 108A, that are each configured to perform processes of a binarization method 204 to generate binary weights for a neural network. The processor 102A may be configured to implement these modules by executing instructions stored in memory 110 and/or by specially configured or dedicated hardware logic circuits provided in the processor 102A. The disclosure examples described herein can be applied to any neural network, including a convolutional neural network. The binarization method 204 may be carried out as part of a training process 200 as shown in FIG. 2, or may be carried out as a separate and independent process.

A simple neural network may comprise of one or more fully-connected (or hidden) layers. Each layer consists of a plurality of neurons, where each neuron has a learnable weight and a learnable bias. Each neuron receives an input value from an input layer, and transforms that input value based on the weight and bias associated with that neuron to generate an output value that is provided as input to one or more neurons of the next layer. This process continues until the final layer generates the ultimate output of the neural network. In this context, a weight matrix for a layer refers to an array of weight values associated with each of the neurons in that layer.

Convolutional neural networks are often used to extract features from input provided by an input layer. In the context of image processing, the input layer may provide input in the form of an image. The input image may comprise of a single channel (e.g. where the elements of the input correspond to pixels of the image that is either black or white in colour). In another example, the input image may be a colour image comprising of multiple channels, where the elements for each channel corresponds to the intensity or degree of a different colour component of the image (e.g. a red channel, a green channel, and a blue channel).

Different filters can be used to detect different features of the input image (e.g. horizontal, vertical or diagonal edges). These features are extracted through convolution using filters whose weights are determined and adjusted through training. A kernel refers to a two-dimensional array of weights (or weight matrix). Each kernel is unique and is used to detect or extract a different feature of the input image. A filter refers to a collection of kernels (e.g. stacked together to form a three-dimensional array). For example, to detect a specific feature in an input image comprising of multiple channels, a different kernel is provided for each channel to detect the relevant feature in each channel. In this scenario, each kernel will have the same size (e.g. a 3×3 matrix), where a filter refers to the set of kernels used for detecting the same relevant feature in different channels of the image. For an input image with only one channel, only one kernel is used for detecting the relevant feature, where hence the filter is the same as the kernel. In the context of convolutional neural networks, the present disclosure may be applied to a kernel of a single channel input layer, or the kernels in one or more filters of a multi-channel input layer.

Convolution refers to the process of generating an output value based on an element-wise multiplication (or dot product) of the weights in a kernel with a corresponding matrix of input values from the input channel associated with the kernel. For example, a 3×3 kernel is initially associated with a matrix of 3×3 input values from the input channel (e.g. starting from one corner of a two-dimensional input matrix of input values for that channel). A dot product is performed between the weights in the kernel and the matrix of input values, with the resulting values added together to generate a single output value for the initial matrix of input weights. The kernel then "slides over" to a different position of the input matrix (e.g. to the left by one element if the "stride" parameter is set to 1) such that the kernel is associated with a different matrix of 3×3 input values. Convolution is then performed on the new matrix of 3×3 input values to generate a corresponding output value. This process is repeated until the kernel "slides over" the entire input matrix.

FIG. 2 is an exemplary flow diagram of a training process 200 according to a representative embodiment of the disclosure, where the binarization method of the present disclosure is used to generate binary weights for a neural network. In the exemplary embodiment shown in FIG. 2, process 200 begins at step 202 with the processor 102A obtaining initial weights for the neural network. The initial weights may be randomly determined floating point weight values for one or more layers (i.e. a dense layer or a fully-connected layer) of a neural network (e.g. a convolutional neural network). Alternatively, the initial weights may be floating point or binary weight values that have been previously determined for a neural network. Such predetermined weight values may be provided to the processor 102A via the input interface 106 (e.g. from a separate device communicating with the system 100), or alternatively, the processor 102A may retrieve any such predetermined weight values stored in memory 104.

At step 204, the processor 102A (and its related modules 104A to 108A) is configured to perform a binarization method for generating binary weights for a neural network. This is described in more detail below with reference to FIGS. 1B and 3 to 6. The binary weights generated at step 204 may be stored in memory 110 for use by the processor 102A in later steps of the training process 200.

At step 206, the processor 102A is configured to provide a neural network with the binary weights generated at step 204. The neural network may be implemented either by the processor 102A of the system 100A, or alternatively, by a processor on a separate device or machine that communicates with the processor 102A or system 100. The neural network is configured (e.g. by the processor 102A) to perform training tasks over a set of training data to determine a training result. For example, the training data may comprise a plurality of training images relating to different subject matter, and the neural network (when configured with the binary weights generated at step 204) is required to generate a training result indicating what the neural network determines to be the subject matter in each training image.

At step 208, the processor 102A evaluates the training result generated at step 206 to evaluate the accuracy of the data model represented by the binary weights generated at step 204. If step 208 determines the accuracy of the model to be acceptable (e.g. the training result is sufficiently close to, or is within an acceptable range of, an expected result), process 200 proceeds to step 210 where the model is determined to be ready for use. In that event, the binary weights corresponding to the data model may be stored in memory 104, and may also be provided via the output interface 108 to a separate device for configuring a neural network on that device. Process 200 ends after step 210. However, if step 208 determines that the accuracy of the model is not acceptable (e.g. the training result is not sufficiently close to, or is not within an acceptable range of, an expected result), process 200 proceeds to step 212.

At step 212, the processor 102A is configured to use a suitable cost function to generate a cost or error associated with the training result generated at step 206. At step 214, the cost or error determined in step 212 is used to determine new weight values (e.g. floating point weights) to be provided as input to the binarization method at step 204. For example, step 214 may involve generating new floating point weight values based on the cost or error determined at step 212 and the input weights previously provided to the binarization method at step 204 (e.g. an input weights last obtained at step 202 or a weights last determined by step 214). Alternatively, step 214 may involve modifying the input weights previously provided to the binarization method at step 204 based on a value determined based on the cost or error determined at step 212. The weights determined by step 214 are stored in memory 104. Process 200 then proceeds to step 204 where the binarization method performs the steps described above using the weights determined by step 214 as input weights.

Although steps 202 and 206 to 214 may be performed by the processor 102A of the system 100A according to one representative embodiment of the disclosure, in other representative embodiments of the disclosure, such steps may be performed on one or more computing devices, processors, chipsets or the like that are separate from (but which communicate and work in conjunction with) the system 100.

Figure 1B:
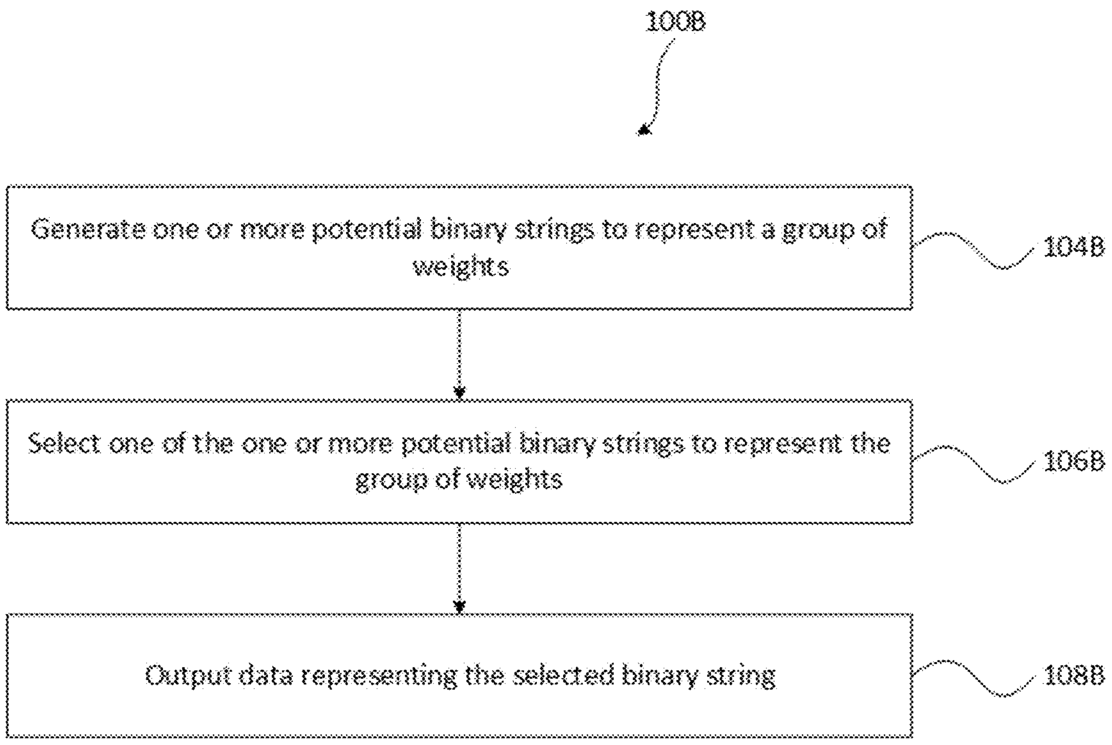
FIG. 1B is an exemplary flow diagram of a method of generating binary weights for a neural network.

FIG. 1B illustrates an example of a binarization method 100B which may be implemented by the processor 102A shown in FIG. 1A. The binarization method 100B may be used in the training process of a neural network, for instance it may be used in step 204 of the method of FIG. 2. Compared to certain other binarization methods, the binarization method 100B of FIG. 1B may reduce the volume of memory required to store the binary weights used in the neural network. As less memory resources are required, the method may allow cheaper hardware to be used and/or reduce the power needed to operate the neural network. The various blocks of the method 100B are described below.

At block 104B the method generates one or more potential binary strings to represent a group of weights taken from a set of input weights for one or more layers of the neural network. The potential binary strings generated to represent the group of weights may be thought of as potential binarization schemes for said group of weights. Accordingly this part of the method may be referred to as binarization scheme generation and may be implemented by the binarization scheme generation module 104A of the processor shown in FIG. 1A.

At block 106B a binary weight string is selected to represent the group of weights from among the one or more potential binary weight strings. The selection is based at least in part on a number of data bits required to represent the potential binary weight strings according to a predetermined encoding method. This part of the method may be thought of as selecting an appropriate binarization scheme (i.e. binary weight string) and may be implemented by the binarization scheme selection module 106A of the processor of FIG. 1A.

The number of data bits required to represent a potential binary weight string may be referred to as the encoding length of the potential binary weight string. As the selection method is based, at least in part, on the encoding length of the selected binary weight string, the method may select binary weight strings which may be encoded more efficiently. In this way, the method may reduce the volume of memory required to store the binarized weights in the neural network.

In some examples, the selection in block 106B may select the binary string which has the lowest encoding length. For example, the binarization scheme selection module may calculate the encoding length for each potential binary weight string and select the string with the lowest encoding length. In other examples, the binarization scheme selection module may also take other criteria into account, such as but not limited to, a probability (referred to as 'global probability') of the potential binary string being a correct one or an expected impact of the potential binary strings on the accuracy of the neural network etc.

At block 108B the method outputs data representing the selected binary weight string for representing the group of weights. In some examples the method may output the selected binary weight string itself. In other examples, the method may output a code word (also referred to as an encoding) for representing the selected binary weight string, wherein the code word is generated according to the predetermined encoding method. Block 108B may implemented by weight generation module 106A of FIG. 1A.

Figure 3:
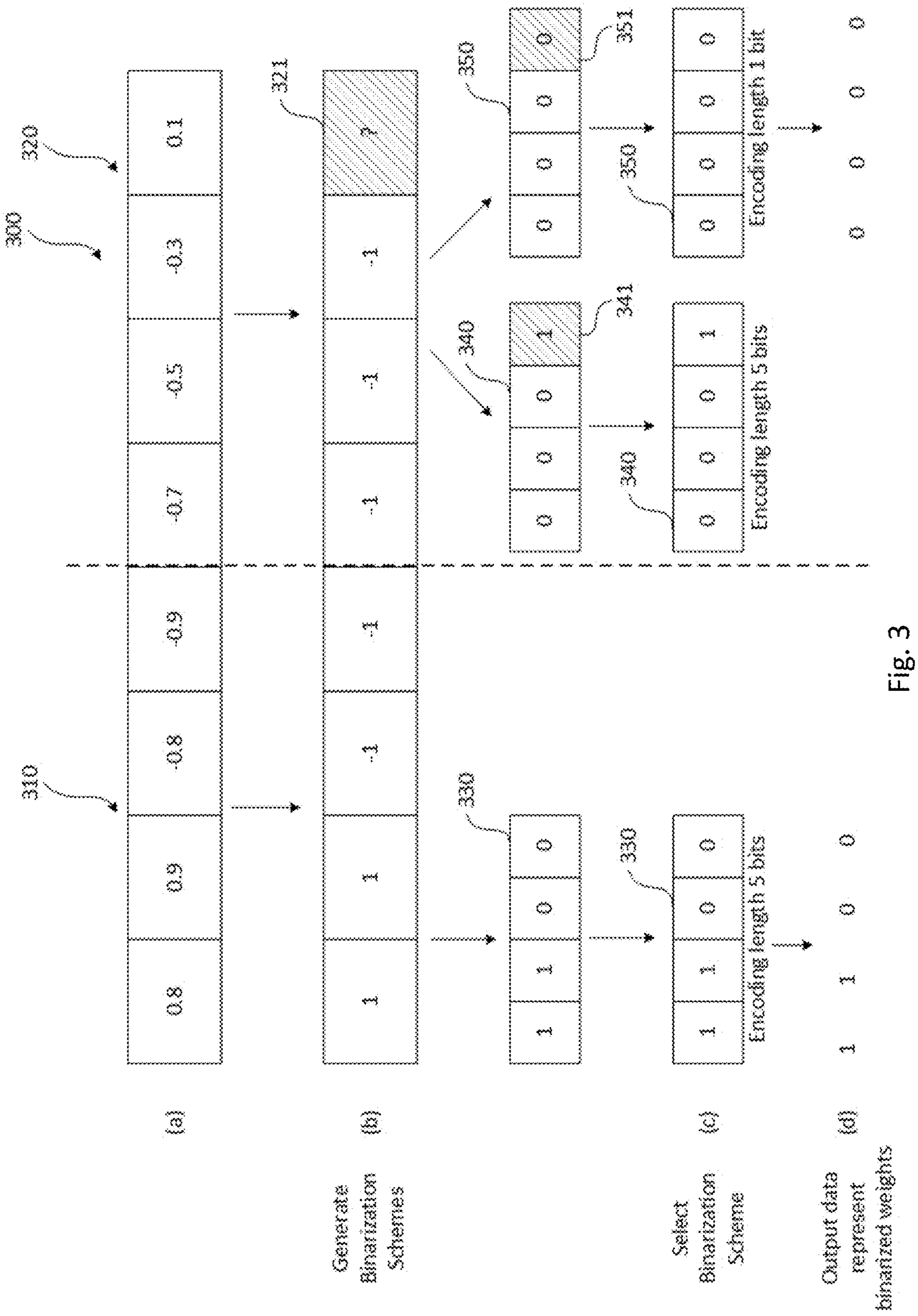
FIG. 3 is diagrammatic example of one possible implementation of the method of FIG. 1B.

The method 100B of FIG. 1B will now be illustrated with reference to a specific example which is shown in FIGS. 3 (*a*) to (*d*).

FIG. 3(*a*) shows a set of input weights 300 for use in one or more layers of a neural network. The set of input weights is divided into a plurality of groups of weights including a first group 310 and a second group 320. In the example of FIG. 3(*a*) the set of input weights includes eight weights and is split into two groups each consisting of four weights. However, it is to be understood this is by way of example only and in practice the set of input weights could be much larger, as modern neural networks have 1000s have weights, and the group size could be more or fewer than four weights.

The set of weights may comprise all of the weights in the neural network, all of the weights in one or more layers of the neural network, or some of the weights in one or more layers of the neural network. Various methods of defining the set of input weights are described in Part 2 of this application. The set of input weights is split into groups (also referred to as encoding groups). Each group forms a basic unit which is to be encoded by an encoding method to reduce the volume of memory needed to store the weights.

The groups may have the same size or may differ in size according to a predetermined rule. For instance in FIG. 3(*a*) each group has four weights and the first four weights go to the first group, the second four weights to the second group etc. In another implementation the first four weights may go to a first group, the second four weights to a second group and the ninth weight to a third group consisting of just one weight, with the next nine weights being grouped in a similar manner. The encoding method may be a run length encoding (RLE) method, Huffman method or other lossless compression method.

FIG. 3 (*b*) shows the groups of weights after each weight has been assigned a first binary value (e.g. +1), a second binary value (e.g. −1) or designated as an ambiguous weight which may be either the first binary value or the second binary value (e.g. +1 or −1). The assignment of binary value may be performed before or after the set of input weights is divided into groups. Various methods may be used to assign the input weights to one of these three categories.

In one example, the input weight may be compared to predetermined thresholds and assigned the first binary value (e.g. +1) if the input weight is higher than a first threshold (e.g. >0.2), assigned a second binary value (e.g. −1) if the input weight is lower than a second threshold (e.g. <−0.2) and otherwise designated as an ambiguous weight (e.g. a weight which may be binarized as +1 or −1). In another example, a probability analysis may be performed on the input weight and the input weight may be assigned a first binary value, a second binary value or designated as an ambiguous weight based on the probability analysis. Probability analysis is explained in more detail in Part 2 of this application. In some examples, the input weights may be normalised before determining the binary values.

In the example of FIG. 3(*b*) it can be seen that the first group does not contain any ambiguous weights. Thus the weights in the first group are binarized as 1, 1, −1, −1 respectively. This binary weight pattern may be represented by the binary string of 1100 denoted by reference numeral 330. Thus only one potential binary string 330 is generated for the first group of weights.

In this example, the second group 320 has one ambiguous weight 321 (the fourth weight in the second group). Therefore, as this ambiguous weight 321 may be binarized as either +1 or −1, two potential binary weight strings 0001 and 0000 are generated for the second group and are denoted by reference numerals 340 and 350 in FIG. 3(*b*). It can be seen that the potential binary weight strings differ due to the different possible values for the ambiguous weights 341, 351. In general a group of weights will have a number of potential binary weight strings equal to $2^n$, where n is the number of ambiguous weights in the group. Thus, while only two potential binary weight strings are shown in the example of FIG. 3, in many cases there may be a larger number of potential binary weight strings, especially if the groups have a larger number of weights.

FIG. 3 (*c*) shows selection of a binary weight string to represent each group of weights. For the first group the selection is straight forward as there is only one potential binary weight string. For groups which have two or more potential binary weight strings, a selection method is used to select one of the potential binary weights to represent the group. This selection method may be based at least in part on an encoding length of a potential binary weight string. The encoding length of a potential binary weight string is a number of data bits required to encode the potential binary weight string according to the predetermined encoding method.

A given encoding method may be more efficient for certain sequences of bits (referred to as "weight patterns"). In the example of FIG. 3 (*c*), when the predetermined encoding method is applied to the first potential binary weight string 340 of the second group, the encoding length is 5 bits. When the predetermined encoding method is applied to the second potential binary weight string 350 of the second group, the encoding length is 1 bit. Therefore, as the second potential binary weight string 350 has a shorter encoding length, the second potential binary weight string 350 is selected to represent the second group of weights.

FIG. 3 (*d*) shows that data representing the selected binary weight strings is output. The output data may comprise the selected binary strings themselves or may comprise compressed data including code words representing the selected binary strings, wherein the code words are generated according to the predetermined encoding method. If the selected binary strings are output in un-encoded form, they may be subsequently encoded before storing in the memory of a neural network.

In example of FIGS. 3 (*c*) and (*d*), the encoding length for the binary string 330 selected to represent the first group is 5 bits, while the encoding length for the binary string 350 selected to represent the second group is 1 bit. Therefore, if the data is output as code words according to the predetermined encoding method, the data will comprise 5+1=6 bits, compared to 4+4=8 bits if the binary strings were output in the original un-encoded form. By reducing the volume of data required to store the input weights, it is possible to implement a neural network in hardware more efficiently at less cost, using fewer memory resources and less power.

As mentioned above, in the some examples the potential binary weight strings may be based on probabilities of each input weight being associated with a particular binary value. For example the processor may include a weight probability analysis module configured to generate, based on the set of input weights, data representing a probability of each said input weight being associated with a binary value. Further, the binarization scheme generation module may be configured to generate the plurality of potential binary weight strings based on the probabilities of the set of input weights. These probabilities may be referred to as 'local probabilities' as they refer to individual weights.

In the example of FIG. 3 (*c*), in cases where a group of weights has a plurality of potential binary weight strings, selection of a binary weight string to represent the group is based at least in part on the encoding length of the binary weight string. In some examples, the selection may take further factors may be taken into account. By taking multiple factors into account an optimum binary string may be selected. For instance, in some examples, the binarization scheme selection module may screen out certain potential binary weight strings according to criteria other than the encoding length, calculate the encoding lengths for a remaining subset of the potential binary weight strings and select the potential binary weight string with the lowest encoding length in said subset. In still other examples a cost function may be used to select the binary weight sting based on the encoding lengths and other criteria.

In some examples, the binarization scheme selection module may be configured to at least: generate data representing a probability value for each said potential binary weight string (referred to as a 'global probability'), generate data representing a number of data bits for representing each said potential binary weight string according to the predetermined encoding method, and perform selection on said potential binary weight strings based on said global probability value and said number of data bits. Further examples regarding probability analysis, local probabilities and global probability values are described in Part 2 of this application.

As described above, the binarization scheme generation module is configured to divide the set of input weights into a plurality of groups of weights and a predetermined encoding method is applied to the groups of weights.

The predetermined encoding method may encode the binary weight strings by using one or more encoding schemes. An encoding scheme maps binary weight strings to code words. In some examples the predetermined encoding method uses a same encoding scheme for each group of weights. The examples given in Part 2 of this application use a same encoding scheme for each group of weights.

In other examples, the predetermined encoding method may use different encoding schemes for at least some of the groups of weights. For instance, for a string of binary weights of a given length, an encoding scheme may map each possible weight pattern (and thus each possible binary weight string) to a respective code word. Different encoding schemes map at least one same weight pattern to different code words.

The binarization scheme generation module may be configured to divide the set of input weights into a plurality of groups of weights and the predetermined encoding method may select an encoding scheme for each group of weights from among a plurality of encoding schemes based on a predetermined rule. For example, the predetermined rule may stipulate that the encoding method uses a predetermined sequence of encoding patterns. Part 3 of this application describes examples using a plurality of different encoding schemes.

Part 2—Processors and Methods Using Probability Analysis

Figure 4A:
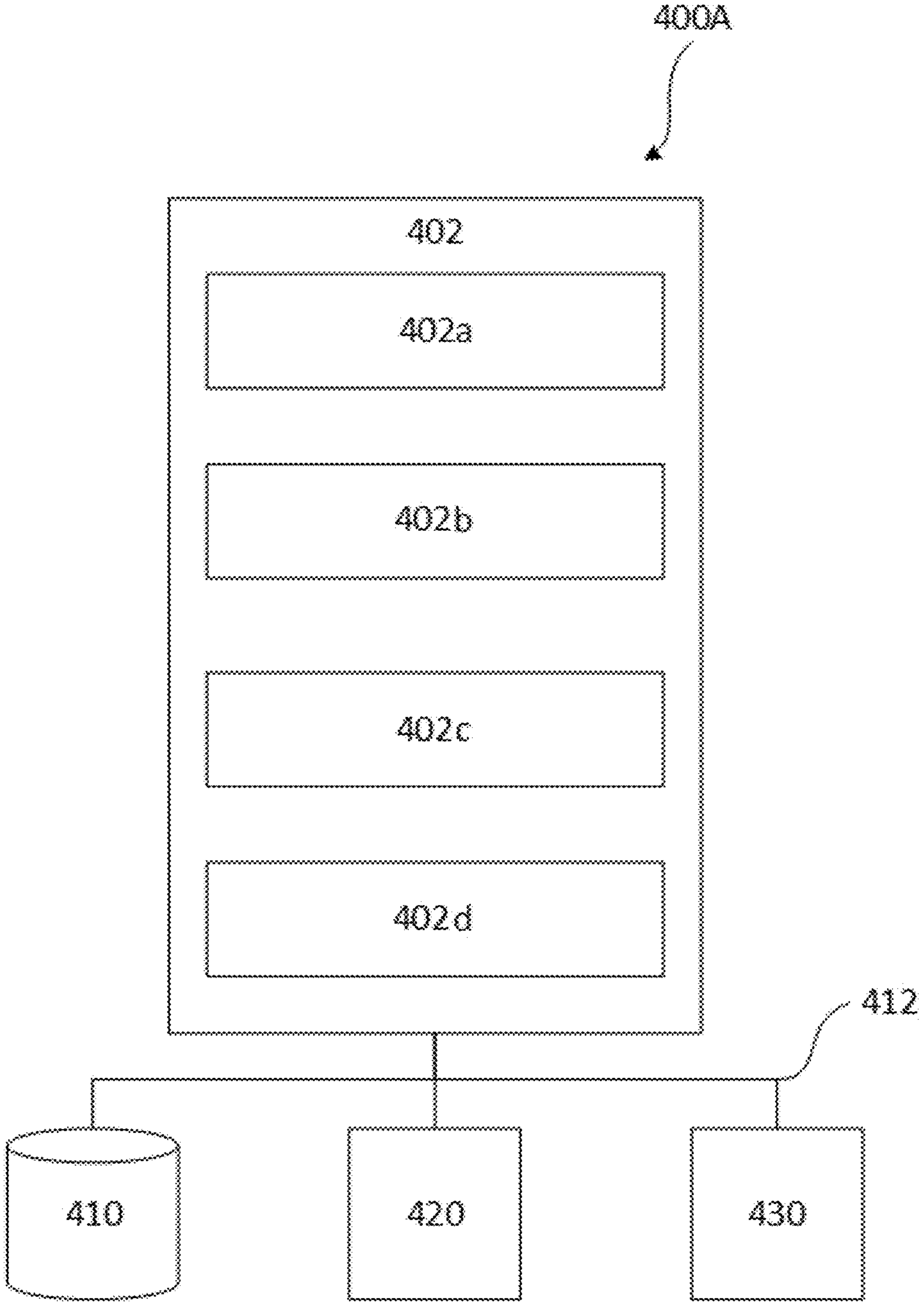
FIG. 4A is a block diagram of an exemplary internal structure of a data processing system suitable for implementing the methods of the present disclosure.

FIG. 4A shows a data processing system 400A which is similar to the system 100A of FIG. 1A. The system 400A includes a processor 402, memory 410, one or more input interfaces 420, and one or more output interfaces 430 which may communicate with each other via a data bus 412 or other communication means, which parts are the same as those described in FIG. 4A. The processor 402 is configured to provide a binarization scheme generation module 402*b*, binarization scheme selection module 402*c* and weight generation module 402*d* which are similar to the modules of the same name described in FIG. 1A. The system of FIG. 4A differs from the system of FIG. 1A in that the processor 402 is further configured to provide a probability analysis module 402*a* which determines a "local probability" or "local weight probability" of an input weight being associated with a binary value.

Figure 4B:
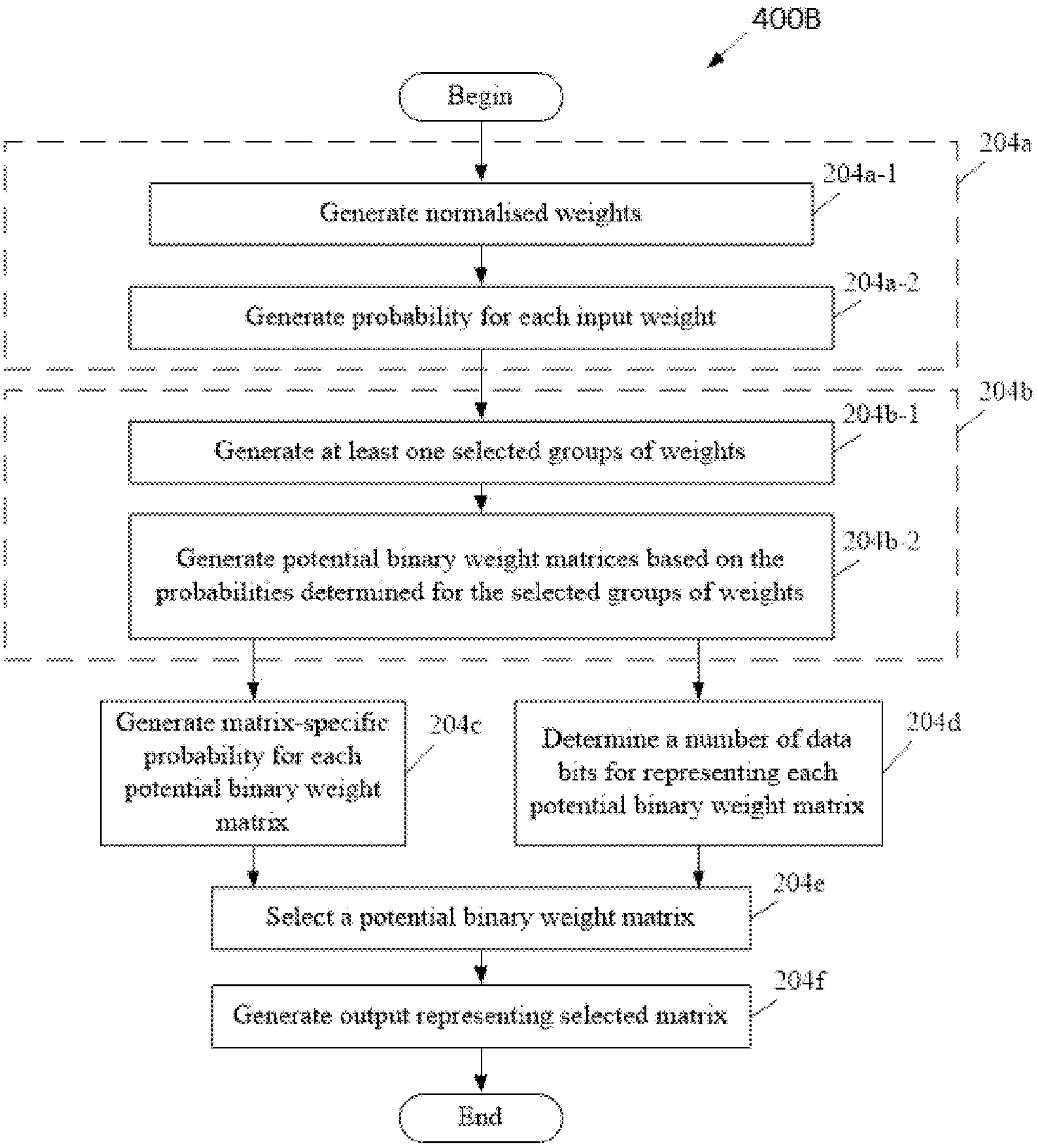
FIG. 4B is an exemplary flow diagram of the key steps in a binarization method according to a representative embodiment of the present disclosure.

FIG. 4B is an exemplary flow diagram showing a method of operation 400B of the processor 402A of FIG. 4A. The method 400B implements as a binarization method for binarizing input weights of a neural network. The method 400B may be used as part of a training method for a neural network, such as step 204 of the method of FIG. 2 or may be implemented independently and separately. The steps of method 400B will now be described.

At step 204*a*, the weight probability analysis module 102*a* of the processor 102 is configured to generate, based on a set of input weights (e.g. for one or more layers) of a neural network, at least data representing a "local" weight probability of each input weight being associated with a binary value. In this context, a binary value refers to one of two potential values (e.g. 1 and −1, or 1 and 0). The input weights may be weights received from step 202 or 214 of the training process 200 in FIG. 2, or may be weights retrieved from memory 104, or may be weights provided to the processor 102 via the input interface 106. In the embodiment shown in FIG. 3, step 204*a* may comprise of steps 204*a*-1 and 204*a*-2.

At step 204*a*-1, the weight probability analysis module 102*a* is configured to generate a set of normalised set of weights based on the input weights. This involves transforming the input weights into corresponding weight values within a predetermined weight range, and use said corresponding weight values as input weights. For example, the maximum absolute value of the floating point input weights for each layer (e.g. weights in each BNN layer) after training usually does not equal to 1, or necessarily fall within a desired range of values (e.g. between 1 and −1). To help more accurately and efficiently estimate the probability of each input weight, step 204*a*-1 is configured to linearly scale each input weight based on a relationship between the value of a particular input weight to be normalised (x) with a maximum absolute value of all input weights for the layer from which input weight (x) belongs. This relationship is represented by Equation 1, where x represents the value of a particular input weight to be normalised, X represents the values of all input weights for the layer from which input weight (x) belongs, and x' represents the normalised weight value generated by Equation 1.

$$x' = \frac{x}{\max(|x|)} \qquad \text{Equation 1}$$

Figure 7:
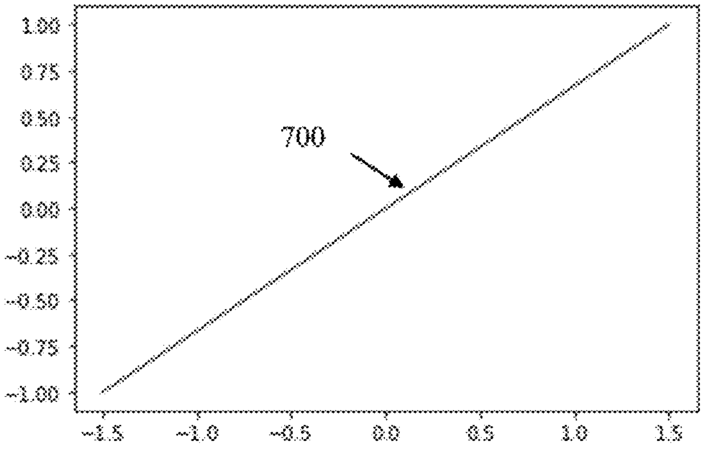
FIG. 7 is a diagram of an exemplary linear relationship for generating normalised weights according to a representative embodiment of the present disclosure.

The normalised weights generated according to Equation 1 will fall within a range of +1 and −1. Those skilled in the art would understand that it is also possible to generate a normalised weight within a different range of binary values (e.g. between 1 and 0). FIG. 7 is an exemplary graphical representation of the relationship represented by Equation 1, where original input weight values ranging from +1.5 to −1.5 are proportionately scaled to normalised weight values ranging from +1 to −1.

At step 204*a*-2, the weight probability analysis module 102*a* is configured to generate, based on a first normalised set of input weights (e.g. for one or more layers) of a neural network, at least data representing a "local" weight probability of each input weight in a second selected or specific set of input weights being associated with a binary value. In this context, a second selected or specific set of input weights may comprise:

i) some of the input weights selected from at least one layer of the neural network;
ii) some of the input weights selected from all layers of the neural network;
iii) all input weights for at least one layer of the neural network; or
iv) all input weights for all layers of the neural network.

A "local" weight probability may be determined based on:

i) a predetermined relationship between different potential values of an input weight and a corresponding probability;
ii) one or more previously determined probabilities for a weight corresponding to an input weight (e.g. based on a sum, average, count, frequency or other value determined based on one or more previously determined probabilities for a weight corresponding to the input weight, where such values may be determined based on one or more prior training events performed for or by the neural network); and/or
iii) one or more previously determined weight values for a weight corresponding to an input weight (e.g. based on a sum, average, count, frequency or other value determined based on one or more previously weight values for a weight corresponding to the input weight based on previous training events, where such values may be determined based on one or more prior training events performed for or by the neural network).

Figure 8:
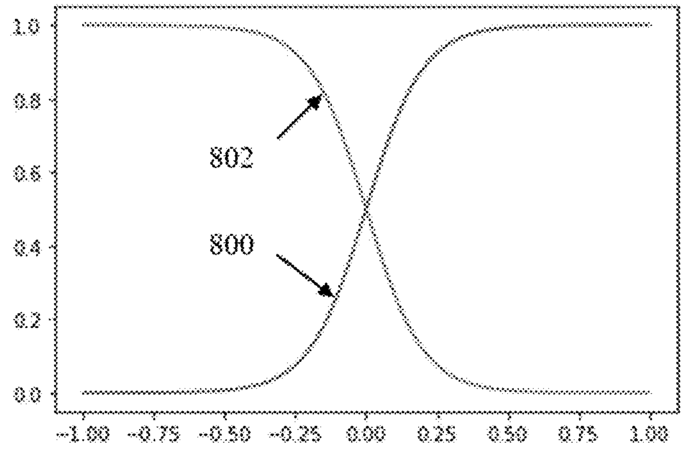
FIG. 8 is a diagram of an exemplary predetermined relationship for determining local weight probabilities for different input weights.

FIG. 8 is a diagram of an exemplary predetermined relationship for determining local weight probabilities for different input weights. A first function 800 may be used to determine a probability (on the vertical axis) that an input weight (on the horizontal axis) is associated with a binary value of +1. Function 800 may be based on a sigmoid function, hyperbolic tangent function, arctangent function, or any other suitable function defining an association between different input weight values and a corresponding probability. Function 800 is characterised by an inflexion point where an input weight of 0 corresponds to a probability of 0.5, with a slope at the inflexion point of approximately 1.6. A second function 802 may be used to determine a probability that an input weight is associated with binary value of −1. In the example shown in FIG. 8, function 802 is an inverse of function 800.

In a representative embodiment of the present disclosure, the predetermined relationship for determining local weight probabilities for different input weights is defined based on Equations 2a, 2b and 3 below, where Equation 2a represents a probability ($p_{+1}$) of an input weight (x') being associated with a binary value of +1, and Equation 3 represents a probability ($p_{-1}$) of an input weight (x') being associated with a binary value of −1. Equation 2b is an alternative way to represent a probability ($p_{+1}$) of an input weight (x') being associated with a binary value of +1.

$$p_{+1} = \max\left(0, \min\left(1, \frac{1+x'}{2}\right)\right) \quad \text{Equation 2a}$$

$$p_{+1} = \frac{\tan(10*x')+1}{2} \quad \text{Equation 2b}$$

$$p_{-1} = 1 - p_{+1} \quad \text{Equation 3}$$

Referring to FIG. 4A, at step 204*b*, the binarization scheme generation module 102*b* of the processor 102 is configured to generate, for a selected group (or coding group) of input weights, at least data representing one or more potential binary weight matrices (or schemes) based on the probability determined for the selected input weights. The potential binary weight matrices correspond to the potential binary weight strings referred to in Part 1 of this application. In the embodiment shown in FIG. 3, step 204*b* may comprise of steps 204*b*-1 and 204*b*-2.

Figure 9:
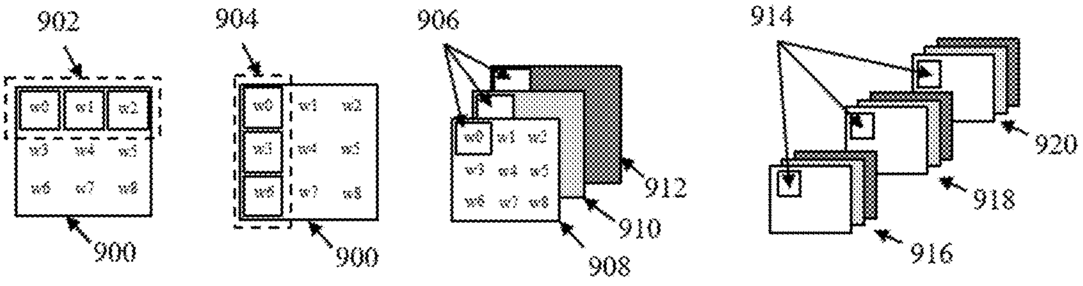
FIG. 9 is a diagram showing examples in which a selected group of weights can be formed according to a representative embodiment of the present disclosure.

At step 204*b*-1, the binarization scheme generation module 102*b* of the processor 102 is configured to define at least one selected group (or coding group) of input weights. The weight matrix per layer usually has multiple dimensions. A convolutional layer would typically have at least four dimensions, including for example: input channel, output channel, kernel row, and kernel column. A fully-connected layer would typically have at least two dimensions, including for example, input size and output size. Step 204*b*-1 involves dividing the weight matrix per layer into smaller selected groups (or coding groups) of weights. A selected group of weights can be formed along any one or more dimensions of the layer. One or more selected groups of weights for a layer can be formed in this way. Where multiple selected groups of weights are generated, each selected group is processed according to steps 204*b*-2, 204*c*, 204*d* below, and the selection at step 204*e* is performed based on the output of steps 204*c* and 204*d* generated for all (or at least some) of the selected groups. For example, as shown in FIG. 9, a 3×3 kernel 900 can be considered as one selected group (or coding group) of weights, where the row and column of the kernel is 3. In FIG. 9, w0 to w8 represent the location of different weights within a 3×3 kernel 900, 908, 910, 912. Alternatively, a selected group of weights can be formed based on other predetermined selection criteria based on one or more dimensions of the layer, including for example:

i) one or more weights from a selected row 902 of a kernel 900 of a convolutional layer;
ii) one or more weights from a selected column 904 of a kernel 900 of a convolutional layer;
iii) one or more weights 906 from different kernels 908, 910, 912 associated with the same channel or filter of a convolutional layer (e.g. where the weights 906 are selected from the same corresponding position in each of the kernels 908, 910, 912—such as comprising of the first bit of the first row in each kernel 908, 910, 912, followed by the second bit of the first row in each kernel 908, 910, 912, followed by the third bit of the first row in each kernel 908, 910, 912, followed by the first bit of the second row in each kernel 908, 910, 912, etc.);
iv) one or more weights 914 from corresponding kernels of different filters 916, 918, 920 associated with the same convolutional layer (e.g. where the weights 914 are selected from the same corresponding position in the kernel for a particular channel (e.g. red channel) in each filter 916, 918, 920—such as comprising of the first bit of the first row in the kernel for the red channel in filters 916, 918, 920, followed by the second bit of the first row in the kernel for the red channel in filters 916, 918, 920, followed by the third bit of the first row in the kernel for the red channel in filters 916, 918, 920, followed by the first bit of the second row in the kernel for the red channel in filters 916, 918, 920, etc.);
v) one or more input weights for a fully-connected layer;
vi) one or more output weights for a fully-connected layer;
vii) a combination of one or more of the above; and/or
viii) a combination of one or more of the above with one or more other predetermined selection criteria.

As can be appreciate from the above examples, a predetermined selection criteria defines the basis on which the weights from one or more kernels (of one or more filters) of a layer are selected and arranged in a certain order. Any basis can be used as predetermined selection criteria, provided that it does not involve random selection, and provided that each weight in the layer can only be selected once (to avoid reselecting the same weights again).

At step 204*b*-2, the binarization scheme generation module 102*b* of the processor 102 is configured to generate at least data representing one or more potential binary weight matrices (or schemes) based on the probability determined for the selected groups of input weights generated at step 204*b*-1.

In each selected group (or coding group) of weights, each floating point weight has a first "local" weight probability of the weight being associated with a first binary value (e.g. +1), and may also have a second "local" weight probability of the weight being associated with a second binary value (e.g. −1). One or more potential binary weight matrices are generated based on one or both of the first and the second "local" weight probability associated with each weight.

For example, according to a representative embodiment of the disclosure, the processor 102 generates all potential binary weight matrices that can be formed based on different combinations of the first and second "local" weight probabilities associated with each weight. For example, where the selected group of weights is a 3×3 kernel, there is a total of $2^9$ (i.e. 512) different 3×3 potential binary weight matrices that are formed. Further processing is performed on each of the generated potential binary weight matrices according to steps 204*c* and 204*d* described below.

In another representative embodiment of the disclosure, the processor 102 is configured to generate one or more potential binary weight matrices based on at least one of the first and second "local" probabilities for each weight, and a predetermined probability threshold. For example, this may be achieved by first generating an initial binary weight matrix from the binary weights corresponding to the greater of the first and second "local" probabilities determined for each weight. Alternatively, the initial binary weight matrix may be generated based on a comparison of one of the first and second "local" probabilities for each weight with a predetermined selection threshold representing a predetermined probability value (e.g. a weight is set to the binary value associated with the first "local" probability if that first probability is equal to or higher than a predetermined selection threshold, and the weight is set to the other binary value if the first probability is below the predetermined selection threshold).

The processor 102 can then compare the "local" probability for each weight in the initial weight matrix with a predetermined evaluation threshold representing a predetermined probability value. The binary weight remains unchanged for weights with a "local" probability that equals or exceeds the evaluation threshold. However, for weights with a "local" probability that fall below the evaluation threshold, these weights do not have a sufficiently strong probability of being associated with their current binary value, and thus further analysis is required considering the possibility of the weight being associated with their current binary value (e.g. +1) or the other binary value (e.g. −1).

The processor 102 can then generate all potential binary weight matrices that can be formed from the initial weight matrix described above, based on different combinations of the first and second "local" weight probabilities associated with weights having a "local" probability lower than the evaluation threshold. The processor 102 generates a number of potential binary weight matrices based on a number of said selected input weights determined to be associated with either said first or second binary value, where each said binary weight matrix comprises a different combination of weight values. For example, depending on the number (n) of weights in the initial binary weight matrix with a "local" probability below the evaluation threshold, the processor 102 will generate $2^n$ different combinations of potential binary weight matrices. The potential binary weight matrices correspond to the potential binary weight strings referred to in Part 1 of this application.

The method for generating potential binary weight matrices may be better understood by way of an example as shown in FIG. 10. The processor 102 first receives input floating point weights for a layer (e.g. corresponding to steps 202 or 214 in FIG. 2) which is shown as an input weight matrix 1002 in this example. The input weights are normalised to values within a predetermined range from +1 to −1 (e.g. corresponding to step 204*a*-1 in FIG. 3) to produce a normalised weight matrix 1004. "Local" weight probabilities of each normalised input weight being associated with either one or both of the potential binary values are determined (e.g. corresponding to step 204*a*-2 in FIG. 3). In this example, matrix 1006 represents the "local" weight probabilities of the normalised input weights being associated with a binary value of +1, and matrix 1008 represents the "local" weight probabilities of the normalised input weights being associated with a binary value of −1. In this example, the selected group of weights (or coding group) is a 3×3 weight matrix (e.g. corresponding to step 204*b*-1 in FIG. 3). An initial binary matrix 1010 is then generated based on the "local" weight probabilities (e.g. corresponding to step 204*b*-2 in FIG. 3). This can be achieved in different ways. One approach is to consider the weights in one of matrices 1006 or 1008, where if matrix 1006 is used, the binary value of the weight in the initial weight matrix is determined to be +1 if the probability for that weight in matrix 1006 equals or exceeds a predetermined selection threshold (e.g. 50%), otherwise the binary value of the weight is determined to be −1. Matrix 1008 can be used in a similar way to determine which weights in the initial weight matrix should have a value of −1. Alternatively, the binary value of the weights in the initial binary matrix 1010 can be generated depending on which matrix (1006 or 1008) has a greater probability for that weight. For example, the binary value for a weight is +1 if matrix 1006 has the higher probability value corresponding to that weight than matrix 1008. The processor 102 then generates one or more potential binary weight matrices based on the binary weights and "local" weight probabilities for each weight in the initial weight matrix 1010 (e.g. corresponding to step 204*b*-2 in FIG. 3). For example, upon comparing the "local" weight probabilities for each weight in the initial weight matrix 1010 with an evaluation threshold (e.g. 55%), the processor 102 determined that only one of the weights has a "local" weight probability below the evaluation threshold (shown in grey in matrix 1012). The processor 102 then generates two potential binary weight matrices 1014 and 1016 (i.e. $2^n$ combinations, where in this example n=1) to represent different combinations of binary weights from the initial weight matrix, where the weight with a "local" probability below the evaluation threshold can take the value of either +1 (in matrix 1014) or −1 (in matrix 1016).

Referring to FIG. 3, the processor 102 is configured to provide a binarization scheme selection module 102*c* that performs steps 204*c*, 204*d* and 204*e* in FIG. 3 to select one of the potential binary weight matrices generated in previous steps.

At step 204*c*, the binarization scheme selection module 102*c* is configured to generate at least data representing a matrix-specific probability value for each potential binary weight matrix. The matrix-specific probability value may also be referred to as a 'global probability', as it refers to the probability of a whole binary weight matrix or binary weight string, rather than the probability of an individual weight. According to one embodiment, generating the matrix-specific probability value involves generating one value based on the product of all "local" weight probabilities for each potential binary weight matrix. In the example shown in FIG. 11, matrices 1102, 1104, 1106 and 1108 represent the binary weights in four different potential binary weight matrices, and matrices 1102', 1104', 1106' and 1108' represent the weight probabilities corresponding to each binary weight in matrices 1102, 1104, 1106 and 1108. The matrix-specific probability value for matrices 1102', 1104', 1106' and 1108' is 0.025038, 0.02507, 0.020060 and 0.020052 respectively.

At step 204*d*, the binarization scheme selection module 102*c* is configured to generate at least data representing a number of data bits for representing each potential binary weight matrix according to a predetermined encoding method. Firstly, the binarized weights in each potential binary weight matrix are encoded in form a string of 1s and 0s. For example, in FIG. 11, the binary weights in matrix 1102 taken row by row (i.e. 1, −1, −1, 1, 1, −1, −1, 1, 1) is encoded into a bit string representation (i.e. 1, 0, 0, 1, 1, 0, 0, 1, 1) where a bit value of 1 represents a binary weight a 1, and a bit value of 0 represents an alternative binary weight (e.g. of −1).

The bit string representation is then segmented into groups of bits for encoding purposes. With reference to the example in FIG. 12, the bits (b0 to b8) representing the weights from a 3×3 potential binary weight matrix (e.g. 1102, 1104, 1106 and 1108) may be segmented into groups of 3 sequential bits (1202, 1204 and 1206), or into two groups of 4 sequential bits (1208 and 1210) and one remaining bit (1212). The groupings shown in FIG. 12 are only examples, and any form of grouping (according to any predefined grouping criteria) can be used.

According to a representative embodiment of the disclosure, the bit string representations of the binary weights are encoded using a general Run Length Encoding (RLE). However, other encoding methods can be used instead, such as a general Huffman coding. The result of a general RLE is mainly comprised of two main parts: a first part that represents a coding arrangement of a particular symbol or a particular group of symbols where each symbol is made up of one or more bits, and a second part that represents symbol information corresponding to said symbol or group of symbols. In a general Huffman coding method, the coding length of each symbol or each group of symbols is defined according to the probability of occurrence of the symbol or the group of symbols.

Figures 11, 12:
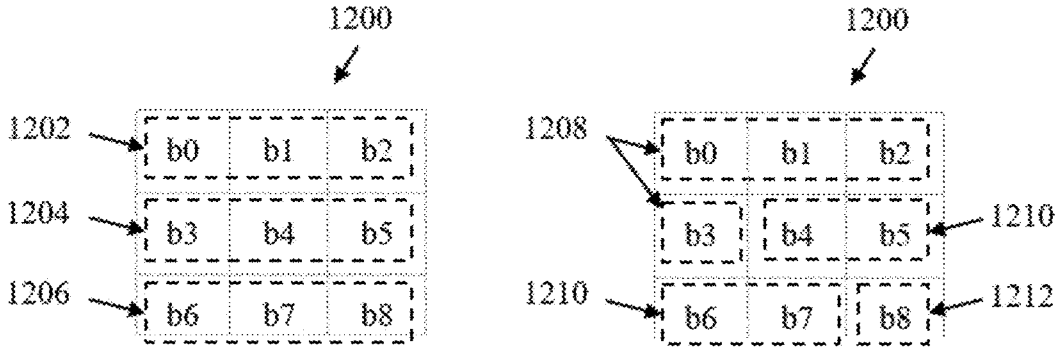
FIG. 11 is a diagrammatic example of a method for selecting a potential binary weight matrix according to a representative embodiment of the present disclosure.
FIG. 12 is a diagrammatic example of a method for determining groups of bits for encoding according to a representative embodiment of the present disclosure.

An example of RLE encoding applied to a bit string representation representing a 3×3 matrix of binary weights that has been segmented into 3 groups of 3 sequential bits (e.g. as shown in FIG. 12) is described with reference to FIGS. 11, 12 and Table 1 below.

i) If the bit pattern in each row 1202, 1204 and 1206 are the same, these rows can be encoded by an encoding pattern indicator of "00" together with the bit string for one of the rows (see Data0 field in Table 1 as shown below). In this scenario, 5 bits are required for encoding.

ii) If the bit pattern in rows 1202 and 1204 are the same and the bit pattern in row 1206 is different, these rows can be encoded by an encoding pattern indicator of "01" together with the bit strings for row 1202 or 1204 (see Data0 field in Table 1) and the bit string for row 1206 (see Data1 field in Table 1). In this scenario, 8 bits are required for encoding.

iii) If the bit pattern in rows 1202 and 1206 are the same and the bit pattern in row 1204 is different, these rows can be encoded by an encoding pattern indicator of "01" together with the bit string for row 1202 or 1206 (see Data0 field in Table 1) and the bit string for 1204 (see Data1 field in Table 1). In this scenario, 8 bits are required for encoding.

iv) If the bit pattern in rows 1204 and 1206 are the same and the bit pattern in row 1202 is different, these rows can be encoded by an encoding pattern indicator of "11" together with the bit string for each row (see Data0, Data1, Data2 field in Table 1). In this scenario, 11 bits are required for encoding.

v) If the bit pattern in each row 1202, 1204 and 1206 are different, these rows can be encoded by an encoding pattern indicator of "11" together with the bit string for each row (see Data0, Data1, Data2 field in Table 1). In this scenario, 11 bits are required for encoding.

TABLE 1

| Row | Encoding pattern indicator | Data 0 | Data 1 | Data 2 | Total encoding bits |
|---|---|---|---|---|---|
| 1 | 00 | b0, b1, b2 | — | — | 5 |
| 2 | 01 | b0, b1, b2 | b6, b7, b8 | — | 8 |
| 3 | 10 | b0, b1, b2 | b3, b4, b5 | — | 8 |
| 4 | 11 | b0, b1, b2 | b3, b4, b5 | b6, b7, b8 | 11 |

As can be understood by one skilled in the art, in the above example, the encoding pattern indicators 01 and 10 could be assigned to the bit strings under any two of the three conditions (ii) to (iv) as illustrated above, while the encoding pattern indicator 11 is assigned to the remaining one condition. Furthermore, the encoding pattern indicators used for encoding the bit strings under the above five conditions can be defined (e.g. by way of predetermined settings or parameters) in any manner and is not limited to the above examples. Each row in Table 1 may be associated with a unique encoding pattern indicator that is different from that shown in Table 1. For example, the encoding pattern indicators used for encoding the bit strings under the above five conditions could be defined as 11, 10, 01, 00, 00 (such that the encoding pattern indicator for rows 1 to 4 of Table 1 would be 11, 10, 01, 00 respectively). Note that assigning a different (e.g. 2-bit) encoding pattern indicator to each row of Table 1 does not change the basis for encoding the data of the type describe in each row of Table 1 (or as described in the conditions (i) to (v) above). Moreover, a bit string representation of the binary weights could be segmented in any manner, for example, being segmented by column, and not limited to the segmentation manner, i.e., being segmented by row, as illustrated in FIG. 12.

At step 204*e*, the binarization scheme selection module 102*c* is configured to perform selection on the potential binary weight matrices based on their corresponding matrix-specific probability value (determined at step 204*c*) and number of data bits for encoding (determined at step 204*d*). There are two approaches for achieving this as shown in FIGS. 5 and 6.

Figure 5:
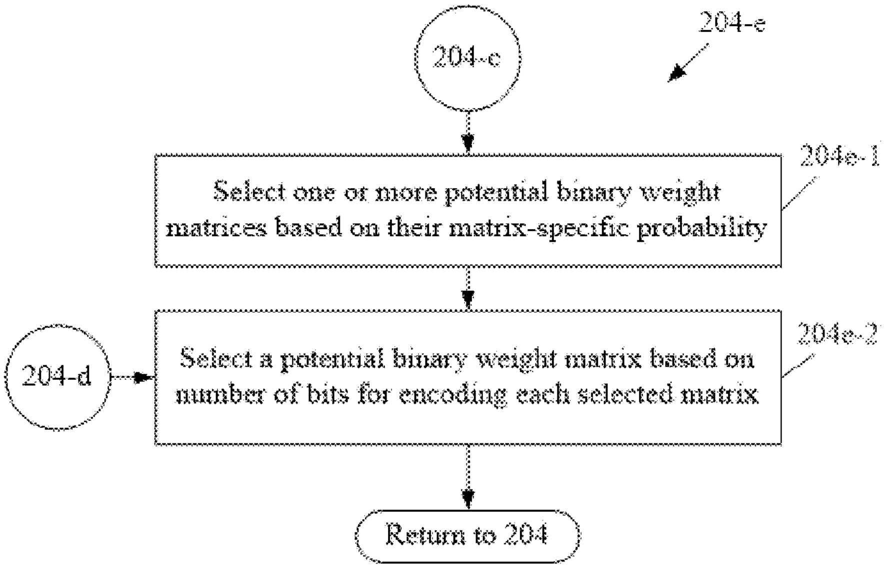
FIG. 5 is an exemplary flow diagram of the key steps in a binary matrix selection step according to a representative embodiment of the present disclosure.

As shown in FIG. 5, according to one representative embodiment of the disclosure, the binarization scheme selection module 102*c* (at step 204*e*-1) is configured to first select one or more potential binary weight matrices based on their matrix-specific probability values (e.g. potential binary weight matrices with the highest matrix-specific probability value, or with a matrix-specific probability values above a predetermined probability threshold for this purpose). At step 204*e*-2, the binarization scheme selection module 102*c* is configured to select one of the potential binary weight matrices selected at step 204*e*-1 based on the number of bits required for encoding each matrix (e.g. requiring the least number of bits for encoding).

Figure 6:
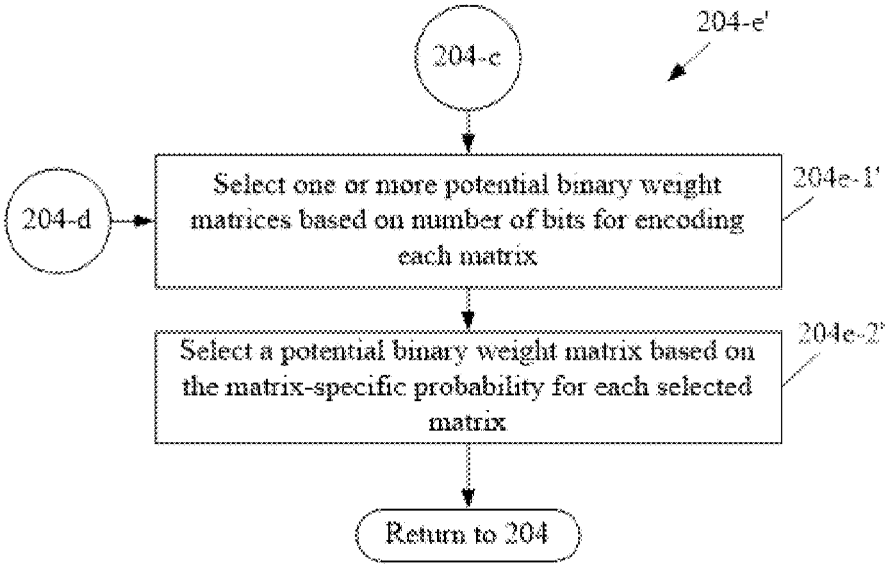
FIG. 6 is an exemplary flow diagram of the key steps in an alternative binary matrix selection step according to a representative embodiment of the present disclosure.

As shown in FIG. 6, according to another representative embodiment of the disclosure, the binarization scheme selection module 102*c* (at step 204*e*-1') is configured to first select one or more potential binary weight matrices based on the number of bits required for encoding each matrix (e.g. requiring the least number of bits for encoding, or below a predetermined bit number threshold for this purpose). At step 204*e*-2', the binarization scheme selection module 102*c* is configured to select one of the potential binary weight matrices selected at step 204*e*-1' based on the matrix-specific probability values for each matrix (e.g. with the highest matrix-specific probability value).

By taking both the matrix specific probabilities and the encoding lengths, an optimum binary weight matrix may be selected to represent the group of weights. In this way the weights may be binarized and encoded efficiently to reduce the volume of memory required to store the neural network, while maintaining accuracy of the neural network.

Referring to FIG. 3, at step 204*e*, the processor 102 is configured to provide a weight generation module 102*d* to generate data of the one or more binary weights according to the potential binary weight matrix selected in step 204*e*.

Figure 4C:
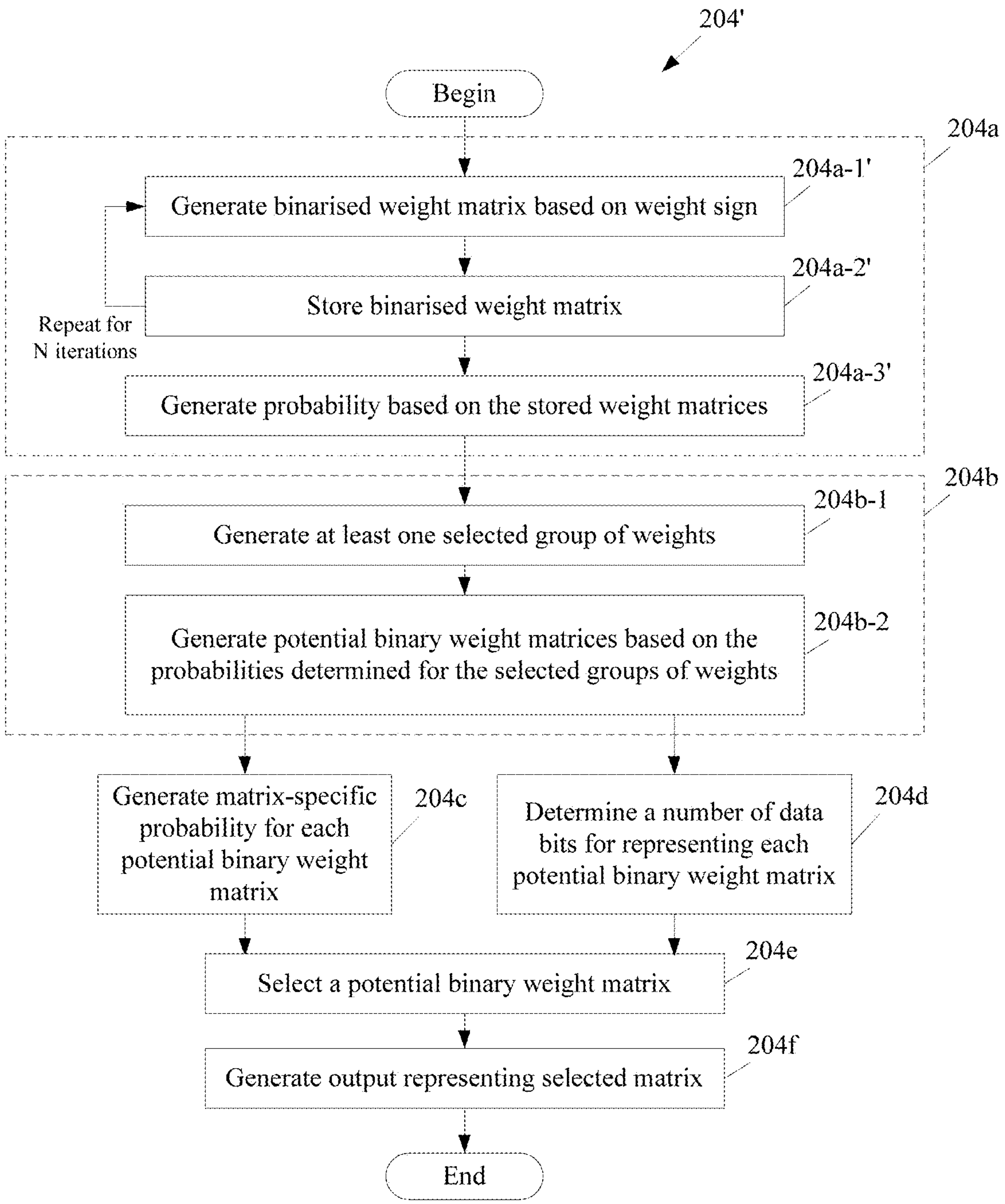
FIG. 4C is an exemplary flow diagram of the key steps in an alternative binarization method according to a representative embodiment of the present disclosure.

FIG. 4C is an exemplary flow diagram of the key steps in an alternative binarization method 204' according to a representative embodiment of the present disclosure. The steps in binarization method 204' are substantially the same as the method 204 shown in FIG. 4B (where the same numbers indicate the same steps), except for steps 204*a*-1', 204*a*-2' and 204*a*-3'. At step 204*a*-1', a binarized weight matrix is generated based on the sign of each floating point input weight (e.g. a binary weight of +1 is assigned to input weights equal to or above 0, and a binary weight of −1 is assigned to input weights below 0). At step 204*a*-2', the binarized weight matrix is stored in memory 104, and steps 204*a*-1' and 204*a*-2' are repeated over a predetermined number (N) of iterations where, for example, different sets of input weights is generated based on different training data used in each iteration. At step 204*a*-3', a "local" weight probability is generated for each input weight based on the stored binarized weight matrices. For example, in step 204*a*-3' a "local" probability for a weight may be determined based on a count (n) that the weight is assigned a binary weight of +1 over N iterations (in which case the probability of the weight being associated with binary +1 may be generated based on the relationship n/N). A "local probability for the same weight being associated with binary −1 may be similar generated (e.g. based on the relationship 1−n/N).

Part 3—Processors and Methods which Use a Plurality of Encoding Patterns

The processors and methods described herein may split a set of input weights for a neural network into a plurality of groups, as described above in Parts 1 and 2 of this application. One or more potential binary weight strings may be generated to represent each group of weights. For groups of weights which have more than one potential binary weight string, a binary weight string may be selected to represent the group based at least in part on a number of bits (i.e. encoding length) required to represent the bit string according to a predetermined encoding method.

The encoding method may use at least one encoding scheme to map binary weight strings to code words. In the examples in Part 2 of this application, the encoding method uses a single encoding scheme, i.e. the same encoding scheme is used for each group of weights.

For instance, an example encoding scheme is shown in Table 1 of Part 2 above. As there is only one encoding scheme in the encoding method of Table 1, a given binary weight string will always be encoded the same way regardless of the group to which it belongs. For example, following the rules in Table 1, the binary weight string 0, 0, 0, 0, 0, 0, 0, 0, 0 will always be encoded as code word 00000 (encoding indicator 00 and bits b1, b0, b2) regardless to which group of weights it belongs.

Part 3 of this application describes examples in which the encoding method uses a plurality of encoding schemes. This may help to improve the compression achieved by the encoding method while maintaining accuracy of the neural network.

Figure 13:
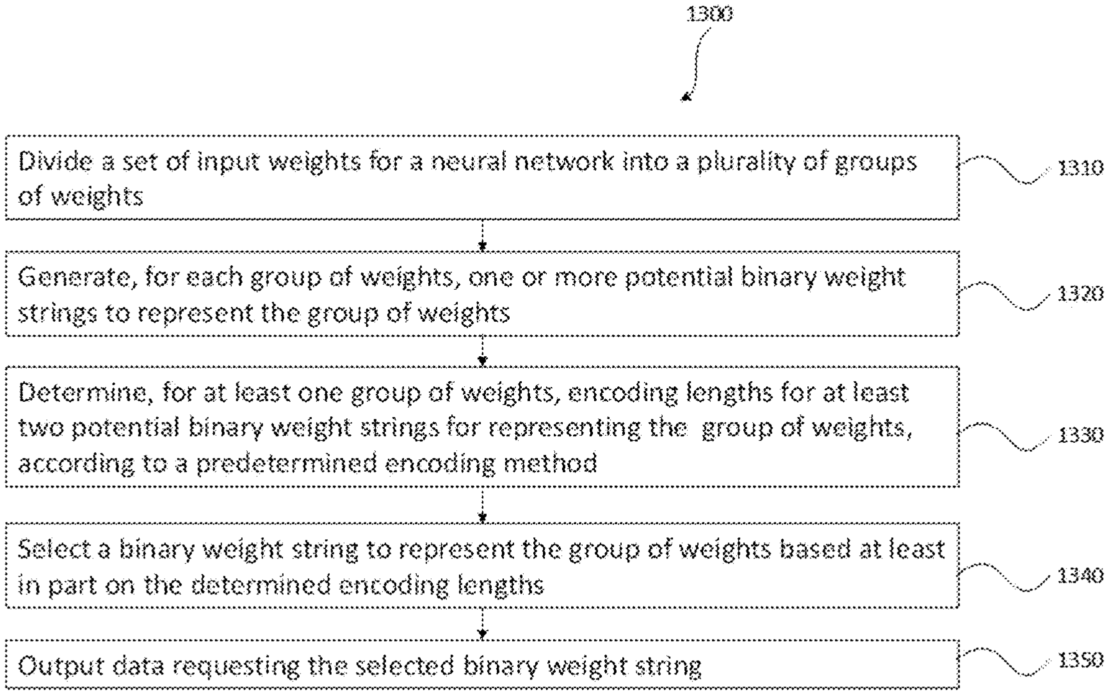
FIG. 13 is an exemplary flow diagram of a method of generating binary weights for a neural network according to a representative embodiment of the present disclosure.

FIG. 13 shows an example of a method 1300 of binarizing weights for a neural network according to Part 3 of this application. The method 1300 may be implemented by a processor, for instance a processor such as those shown in FIG. 1A or FIG. 4A. The method 1300 of FIG. 13 may be used as part of a training method, such as binarization step 204 in FIG. 2, or may be used separately and independently of any training method. The method will now be described.

At block 1310 a set of input weights for one or more layers of a neural network is divided into a plurality of groups of weights.

At block 1320 for each group of weights, one or more potential binary weight strings are generated for representing the group of weights.

Blocks 1310 and 1320 may for example be performed by a binarization scheme generation module, such as module 104A of FIG. 1A or module 102*b* of FIG. 4A.

At Block 1330, for at least one group of weights, encoding lengths are determined for at least two potential binary weight strings for representing the group of weights according to a predetermined encoding method.

At block 1340 a binary weight string is selected to represent the at least one group of weights, from among the at least two potential binary weight strings, based at least in part on the determined encoding lengths. Block 1340 may output the selected binary weight string in the original form or in encoded form (e.g. as a code word generated by the predetermined encoding method).

Blocks 1330 and 1340 may be performed for at least one group of weights from among the plurality of groups of weights of blocks 1310 and 1320. The at least one group of weights may comprise all of the groups of weights from the plurality of groups of weights or a subset of the plurality of groups of weights. For instance groups of weights which have at least two potential binary weight strings. Blocks 1330 and 1340 may be performed by a binarization scheme selection module, such as the module 104B in FIG. 1A or module 102*c* in FIG. 4A. For groups of weights which have only one potential binary weight string, that potential binary weight string is selected to represent the group and calculation of encoding lengths may not be needed.

At block 1350 data representing the selected binary weight strings for each group is output. Block 1350 may for example be performed by a weight generation module, such as module 104C in FIG. 1A or module 102*d* in FIG. 4A.

In some examples, at block 1350, the weight generation module may output the data as encoded binary weight strings (e.g. code words) which have been encoded (i.e. compressed) according to the predetermined encoding method so that the output data occupies less memory space. In other examples, the weight generation module may output the uncompressed selected binary weight strings for each group and the data may be encoded (i.e. compressed) later. For instance, the data may encoded (i.e. compressed) when being written to a device which is to implement an inference phase of the neural network.

It is important to note that the predetermined encoding method referred to in FIG. 13 is configured to select an encoding scheme for each group of weights from among a plurality of encoding schemes according to a predetermined sequence. The use of a plurality of encoding schemes according to a predetermined sequence may enhance compression while maintaining accuracy of the neural network.

Figure 14:
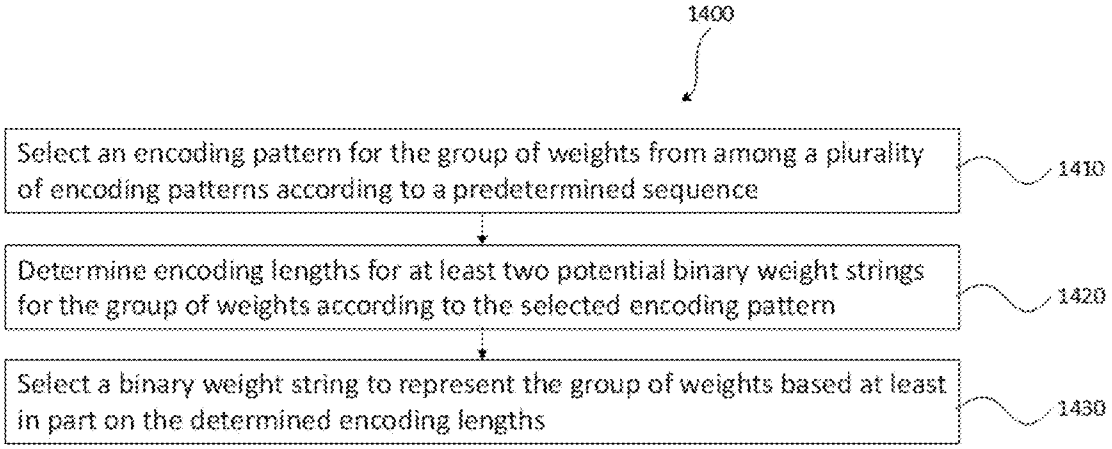
FIG. 14 is an exemplary flow diagram of a method of selecting a binary weight string to represent a group of weights according to a representative embodiment of the present disclosure.

An example implementation of block 1330 is shown in FIG. 14.

At block 1410 an encoding pattern is selected for the group of weights from among a plurality of encoding patterns according to a predetermined sequence.

At block 1420 encoding lengths are determined for at least two potential binary weight strings for the group of weights according to the selected encoding pattern.

At block 1430 a binary weight string is selected to represent the group of weights based at least in part on the determined encoding lengths.

The binarization scheme selection module may perform this process for each group of weights to which block 1330 of FIG. 13 is applied. In this way the binarization scheme selection module may select a binary weight string for each group which will best fit the encoding scheme applied to that group when the data representing the binary strings is encoded according to the predetermined method.

As the predetermined encoding method utilises encoding schemes according to a predetermined sequence, it is not necessary for the encoded data to include additional data bits (such as encoding scheme indicators) to indicate which encoding scheme is used for each part of the encoded data. For example, a decoder may be configured to decode the encoded data by using the same encoding schemes according to the same predetermined sequence. In this way, by using a predetermined sequence, the volume of memory needed to store data representing the binary weight strings may be reduced even further.

Where there are a plurality of encoding schemes, a given binary weight string may be encoded differently depending upon the group to which it belongs. For instance, the scheme selection module may be configured to select a binary weight string for a group of weights based on encoding lengths determined according to a first encoding scheme and select a binary weight string for another group of weights based on encoding lengths determined according to a second encoding scheme. Encoding schemes encode binary weight strings as code words and different encoding schemes will encode at least one same binary weight string as different code words. As will be explained below, using a plurality of different encoding schemes may increase the compression for a set of input weights comprising a plurality of groups of weights, while still maintaining accuracy in the neural network.

Various encoding schemes have been devised in an attempt to achieve a better compression rate. The compression rate is defined as the number of bits when the binarized weights are represented without compression (i.e. in unencoded form) divided by the number of bits required to represent the binarized weights with compression (i.e. when the binarized weights are converted to binary weight strings and the binary weight strings are encoded). Table 2 shows an example of one encoding scheme devised by the inventors.

TABLE 2

| Row | Weight Pattern Type | Example Weight Patterns | Code Word | Encoding Length |
|---|---|---|---|---|
| 1 | Patterns for which all binary weights are the same | 0000/1111 | 0_b0 | 2 |
| 2 | All other patterns | b0b1b2b3 where b0, b1, b2, b3 are not all the same value | 1_b0b1b2b3 | 5 |

The encoding scheme of Table 2 is applied to binary weight strings having a length of 4 bits. For a binary weight string having a length of 4 bits there are 24=16 possible different weight patterns, i.e. 0000, 0001, 0010, 0011 . . . 1111. Thus the encoding scheme maps each of these possible weight patterns to a different code word. In this encoding scheme, the way in which the code word is generated depends upon the type of weight pattern.

In a first type of weight pattern, as shown in Row 1, all of the binary weights are the same. There are two possible weight patterns in which all the weights are the same: 0000 and 1111. These weight patterns are encoded as 0_b0, where the data bit before the underscore "_" indicates a prefix of the code word and the data bit(s) after the underscore "_" indicate a data section of the code word. B0 indicates the value of the first bit in the weight pattern. Thus if the weight pattern is 0000, then the prefix is 0 and the data section is b0 which is 0, so the code word will be 00. However, if the weight pattern is 1111, then b0 is 1, so the code word will be 01. In either case, the encoding length is 2 bits.

A second type of weight pattern, as shown in Row 2, includes all of the other possible weight patterns. There are 14 such other possible weight patterns in a bit string which is 4 bits long. These weight patterns are encoded as 1_b0b1b2b3, where 1 is the pre-fix and b0b1b2b3 is the data section of the code word. b0, b1, b2 and b3 indicate the values of the first, second, third and fourth bits in the weight pattern respectively. Thus, for example, if the weight pattern is 1001, then the code word will be 11001; if the weight pattern is 1010, then the code word will be 11010 etc. In each case the encoding length is 5 bits.

Therefore, with the encoding scheme of Table 2, binary weight strings matching the weight patterns 0000 or 1111 will be encoded with a 2 bit code word, while bit strings matching other weight patterns will be encoded with a 5 bit code word. The original binary weight strings have 4 bits. Therefore the encoding scheme will achieve a reasonable compression ratio as long as there is a sufficient number of binary weight strings which match the 1111 or 0000 weight patterns.

As the binarization method of FIGS. 13 and 14 selects binary weight strings based at least in part on encoding length, when the encoding scheme of Table 2 is used, the binarization method will preferentially select binary weight strings which match the weight patterns 1111 and 0000, which have a low encoding length.

The encoding scheme of Table 2 is one example of many possible encoding schemes which encode a binary weight string into a fixed length pre-fix and a variable length data section, wherein a value of the pre-fix determines the length of the data section. It will be appreciated that the encoding scheme of Table 1 also works in this way (in Table 1 the weight pattern indicator acts as a pre-fix and the contents of Data1, Data 2 and Data 3 act as the data section).

To improve the compression ratio further, the inventors modified the encoding scheme of Table 2 and came up with the encoding scheme shown in Table 3.

TABLE 3

| Row | Weight Pattern Type | Example Weight Patterns | Code Word | Encoding Length |
|---|---|---|---|---|
| 1 | Patterns for which all binary weights are 0 | 0000 | 0 | 1 |
| 2 | All other patterns | b0b1b2b3 where b0, b1, b2, b3 are not all the same value | 1_b0b1b2b3 | 5 |

The encoding scheme of Table 3 is similar to Table 2 and uses the same notation, but differs in that the first type of weight pattern includes only a single weight pattern 0000 which is encoded as the code word 0. That is the code word includes the pre-fix only and no data section. As the encoding length for binary weight strings matching 0000 is only 1 bit long, the compression ratio will be better than the encoding scheme of Table 2 if there are a large number of binary weight strings matching this weight pattern.

It will be appreciated that while in Table 3 the lowest length code word is 0 and the weight pattern 0000 is assigned the lowest length code word, this is just an example. In other similar encoding schemes a different pattern (e.g. 1111) could be assigned the lowest length code word. Further, the lowest length code word could be 1 and the pre-fix for other code words could be 0. Thus Table 3 is one example of a type of encoding scheme in which the code word comprises a pre-fix and variable length data section, and in which a first value of pre-fix has a zero length data section and a second value of pre-fix has a data section of a length equal to the length of the binary weight string being encoded.

Put another way, the encoding scheme encodes a binary weight string into a first pre-fix value and no data section if the binary weight string matches a predetermined weight pattern of the encoding scheme and otherwise encodes the binary weight string into a second pre-fix value and a data section comprising the binary weight string.

The above encoding schemes have been tested on sets of weights for neural networks in order to assess the achievable compression ratio and retraining accuracy. The results are shown in Table 4.

TABLE 4

| Type of Encoding Scheme | Encoding scheme details | Retrain accuracy | Compression ratio |
|---|---|---|---|
| Simple quantization | 1 bit: b0 (0/1) | 95% | No compression |
| Table 2 (Balanced RLE) | 2 bits: 0_b0 (0000/1111)<br>5 bits: 1_b0b1b2b3 | 94.9% | Medium |
| Table 3 (Unbalanced RLE) | 1 bits: 0 (0000)<br>5 bits: 1_b0b1b2b3 | 20% | High |

The first row of Table 4 shows simple quantization, in which each input weight for the neural network is assigned a binary weight based on its sign. In this case there is no compression, but the retraining accuracy is 95%. Retraining accuracy refers to the accuracy of the binarized neural network in classifying input feature maps (after re-training as shown in FIG. 2 steps 206-214) compared to the accuracy of the same neural network using non-binarized floating point weights.

The second and third rows shows the results using a binarization method as described in Parts 1 and 2 of this application, in which binary weight strings to represent the input weights of the neural network are selected according to encoding length by an encoding method which uses only a single encoding scheme. When the encoding scheme of Table 2 was used a medium level of compression was achieved and the retrain accuracy was 94.9%. However when the encoding scheme of Table 3 was used, although a high level of compression was achieved, the retrain accuracy plummeted to 20%. This loss of accuracy could not be recovered even after retraining of the neural network.

The inventors theorized that the encoding scheme of Table 3 may have reduced the accuracy of the binarized neural network by over-selection of binary weight strings containing only 0s. Therefore, to improve the accuracy, the inventors developed an encoding method which used a plurality of encoding schemes in the hope that any selection bias caused by one of the encoding schemes would be balanced out by selection bias of the other encoding scheme(s). Table 5 shows the results of this method compared to the methods of Table 4.

TABLE 5

| Type of Encoding Scheme | Encoding scheme details | Retrain accuracy | Compression ratio |
|---|---|---|---|
| Simple quantization | 1 bit: b0 (0/1) | 95% | No compression |
| Table 2 (Balanced RLE) | 2 bits: 0_b0 (0000/1111)<br>5 bits: 1_b0b1b2b3 | 94.9% | Medium |
| Table 3 (Unbalanced RLE) | 1 bits: 0 (0000)<br>5 bits: 1_b0b1b2b3 | 20% | High |
| Method using two unbalanced encoding schemes according to predetermined sequence | Scheme 1:<br>1 bits: 0 (0000)<br>5 bits: 1_b0b1b2b3<br>Scheme 2:<br>1 bits: 0 (1111)<br>5 bits: 1_b0b1b2b3 | 94.9% | High |

The first three rows of Table 5 are the same as Table 4. The last row shows an encoding method which swaps between a first encoding scheme and second encoding scheme according to a predetermined sequence. The first encoding scheme is the same as the encoding scheme of Table 4. The second encoding scheme is similar to the first encoding scheme, except that the weight pattern 1111 (instead of 0000) is assigned to the 1 bit code word 0. The second scheme thus biases the binary weight string selection towards weight patterns in which all binary weights are 1. The first and second encoding schemes were considered to be unbalanced, but by alternating between the first and second encoding schemes, the encoding method achieved a balance. It was found that this approach achieved a high compression ratio while keep the retraining accuracy at 94.9%.

Through further work, the inventors found that high compression and retraining accuracy could be achieved by encoding methods comprising a plurality of encoding schemes, in which at least some of the encoding schemes are unbalanced. The condition is that the encoding schemes are used according to a predetermined sequence which balances the encoding schemes over a plurality of groups of weights which make up a set of input weights, such that the binarization of the set of input weights is balanced. The concepts of balance and unbalance will now be explained and defined.

Figure 15:
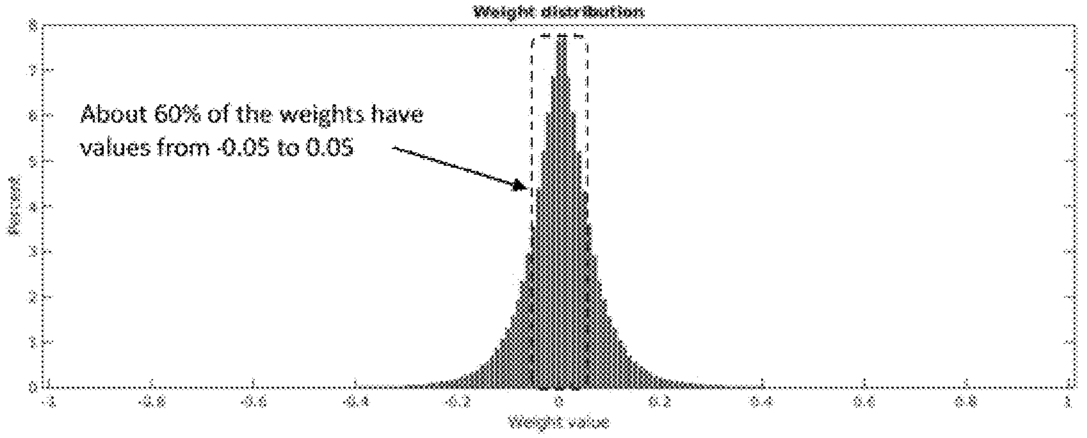
FIG. 15 is a graph showing a distribution of weight values in a neural network according to a representative embodiment of the present disclosure.

The inventors investigated the characteristics of the neural network to determine why the accuracy dropped by so much and found that the distribution of original (non-binarized)

input weight values in the tested neural network were predominately near to 0. In fact, as shown in FIG. 15, about 60% of the input weights were in the range −0.05 to 0.05. As there are many weights near the 0 value, many of the weights can be considered to be ambiguous and it is therefore possible to change the binary values of certain weights to create binary weight strings matching highly compressible weight patterns. As a result the encoding schemes and binarization methods described herein were able to achieve a high degree of compression.

Through further investigation, the inventors found that the accuracy of a neural network binarized according to binarization methods of the present disclosure was sensitive to the ratio of high to low binary values (e.g. ratio of is to 0s) in the set of binarized weights. Specifically where the ratio of high to low binary values produced by the binary weight string selection differed substantially from the ratio of high to low binary values produced by simple quantization in which binary values are assigned according to sign of the input weight (i.e. the method of row 1 of Tables 4 and 5), this resulted in a drop in accuracy.

Accordingly, an unbalanced encoding scheme is an encoding scheme under which the binary weight strings selected to represent groups of weights according to the unbalanced encoding scheme have a substantially different ratio of high bits to low bits compared to if the binarization had been performed based on signs of the weights.

An encoding method may deploy a plurality of unbalanced encoding schemes according to predetermined sequence which achieves balanced binarization for a set of input weights. Binarization of the set of input weights is balanced when the binary strings selected to represent the set of input weights have a substantially same ratio of high bits to low bits as if the binarization had been performed based on signs of the input weights. The set of input weights may be input weights for one or more layers of a neural network and/or may be defined as explained in Part 2 of this application.

The predetermined sequence may balance the binarization of input weights for the neural network as a whole and/or for individual parts of the neural network. In some examples, the predetermined sequence may balance the binarization for each layer of the neural network or for other smaller parts of the neural network. Where each layer of the neural network is balanced, the neural network as a whole will be balanced, but it is thought that due to each layer being balanced the retraining accuracy may be higher.

The concepts of balance and unbalance have been explained above with reference to the output data. The particular structural characteristics which produce balanced and unbalanced encoding schemes and the structural characteristics of predetermined sequences of encoding schemes which achieve balance will now be described.

Each encoding scheme maps a plurality of possible weight patterns to a plurality of code words. The plurality of possible weight patterns may include some or all possible weight patterns having a predetermined length (the predetermined length being equal to the number weights in the group being encoded). For instance for a binary weight string of 4 bits, there are 24=16 possible weight patterns. An encoding scheme for a binary weight string having 4 bits will thus map the 16 possible weight patterns to 16 different code words. Some of the code words may be shorter than other code words. Some encoding schemes have a shortest length code word, which is shorter than all of the other code words in the encoding scheme.

In some examples of the present disclosure the predetermined encoding method includes a plurality of encoding schemes, wherein each encoding scheme assigns a shortest length code word to a selected weight pattern, with each encoding scheme assigning the shortest length code word to a different weight pattern.

In some examples at least some of the encoding schemes assign only a single weight pattern to their shortest length code word. For instance, scheme 1 in row 4 of Table 5 assigns the shortest length code word (0) to the weight pattern 0000, while scheme 2 in row 4 of Table 5 assigns the shortest length code word (0) to the weight pattern 1111.

While the encoding schemes have been explained with reference to run length encodings (RLE) and more specifically to RLEs which have a pre-fix and a variable length data section, the present disclosure is not limited thereto and the concept of balanced and unbalanced encodings applies to other types of encoding scheme as well. An example of a Huffman encoding scheme is shown in Table 6, which does not have a pre-fix, but to which the lowest length code word is assigned to the weight pattern 0000. Of course this is Just one example of a Huffman encoding scheme and in other examples the shortest length code word may be assigned to a different weight pattern.

TABLE 6

| Encoding scheme 1 | | Encoding scheme 2 | |
|---|---|---|---|
| Weight Pattern | Code Word | Weight Pattern | Code Word |
| 0000 | 0 | 1111 | 0 |
| 0101 | 10 | 1010 | 10 |
| 0011 | 110 | 1100 | 110 |
| 1001 | 1110 | 0110 | 1110 |
| 0001 | 1111000 | 1110 | 1111000 |
| 0010 | 1111010 | 1101 | 1111010 |
| 0100 | 1111100 | 1011 | 1111100 |
| 1000 | 1111110 | 0111 | 1111110 |
| 1010 | 1111111000 | 1000 | 1111111000 |
| 1011 | 1111111001 | 1001 | 1111111001 |
| 1100 | 1111111010 | 0000 | 1111111010 |
| 1101 | 1111111011 | 0001 | 1111111011 |
| 1110 | 1111111100 | 0010 | 1111111100 |
| 1111 | 1111111101 | 0011 | 1111111101 |
| 0110 | 1111111110 | 0100 | 1111111110 |
| 0111 | 1111111111 | 0101 | 1111111111 |

The binarization method will preferentially select binary weight strings matching the weight pattern having the shortest length code word. Therefore the shortest length code word in an encoding scheme may be assigned to a weight pattern which occurs, or is expected to occur, frequently in a neural network. Encoding schemes which assign a single selected weight pattern to the shortest length code word will typically be unbalanced.

As an encoding scheme may bias the binarization of the groups of weights to a first binary weight string which has shortest length code word according to said encoding scheme, while another encoding scheme may bias the binarization of the groups of weights to a second particular binary weight string which has shortest compression code according to the another encoding scheme, wherein the first and second binary weight strings are different from each other, examples of the present disclosure propose using a plurality of encoding schemes according to a predetermined sequence so as to make the binarization of a plurality of groups of weights balanced.

Figure 16:
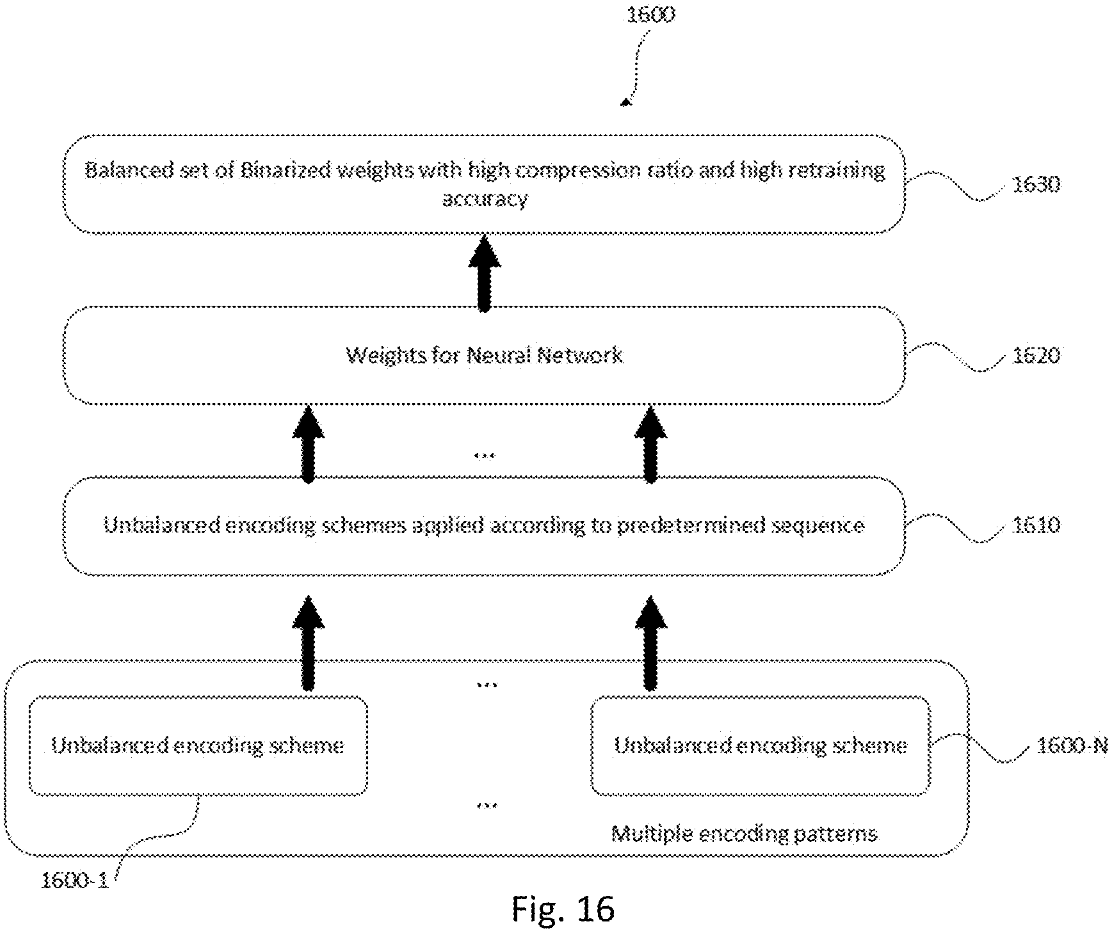
FIG. 16 is an exemplary flow diagram of a method of balancing binarization of a set of weights in a neural network according to a representative embodiment of the present disclosure.

Accordingly, as shown in FIG. 16, an example method 1600 according to the present disclosure propose using a predetermined sequence which balances the encoding schemes. The encoding method 1600 includes a plurality of encoding schemes 1600-1 . . . 1600-N. At least two of the encoding schemes are unbalanced, but the encoding method may in some cases use balanced encoding schemes as well. The encoding method cycles though the encoding schemes according to a predetermined sequence 1610, such that the encoding schemes are applied to the input weight for the neural network 1620 according to the predetermined sequence. For instance an encoding scheme is selected for each group of weights in the set of weights according to the predetermined sequence. This produces a balanced set of binarized weights 1630 for the neural network with a relatively high compression ratio while achieving good retraining accuracy.

In terms of structure, in order to balance binarization of the set of input weights, the predetermined sequence should be such that a ratio of high bits to low bits in the combination of the selected weight patterns (i.e. lowest encoding length weight patterns) associated with the encoding schemes in a complete cycle of the predetermined sequence is equal to a predetermined ratio. The predetermined ratio is the ratio of high bits to low bits obtained by performing binarization on a set of weights by a convention method, e.g. by sign of the weights.

Figure 17:
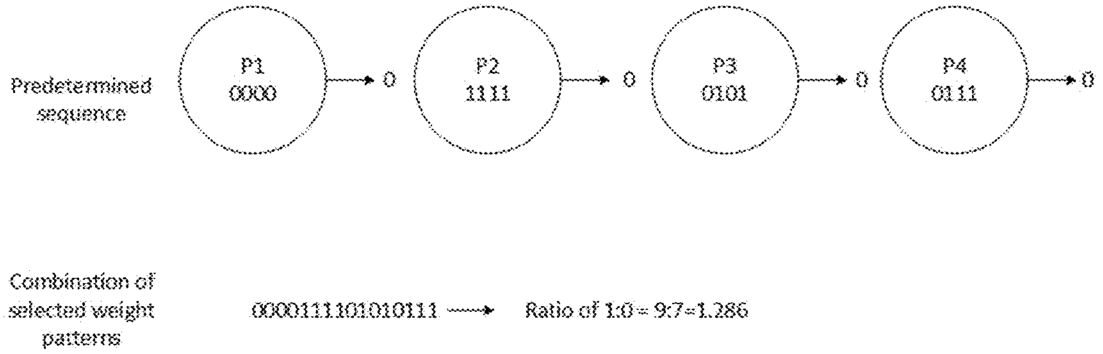
FIG. 17 shows an example of a predetermined sequence of encoding schemes according to a representative embodiment of the present disclosure.

This can be better understood with reference to FIG. 17, which shows an example encoding method including a plurality of encoding schemes p1, p2, p3, p4. The encoding method applies the encoding schemes to groups of weights according to the predetermined sequence p1, p2, p3, p4. So the encoding scheme p1 is applied to the first group, p2 to the second group, p3 to the third group, p4 to the fourth group, p1 to the fifth group, p2 to the sixth group etc. For simplicity of illustration only the shortest length code word and corresponding selected weight pattern is shown for each encoding scheme. In this example, the shortest length code word for each scheme is 0; for p1 the shortest length code word 0 is assigned to the weight pattern, 0000, for p2 to 1111, for p3 to 0101 and for p4 to 0111.

The combination of the selected weight patterns (i.e. lowest encoding length weight patterns) associated with the encoding schemes in a complete cycle of the predetermined sequence is 0000111101010111. This combination has a ratio of is to 0s of 9:7 or approximately 1.286. Accordingly if the ratio of is to 0s for the set of weights of the layer, part or whole of the neural network when binarized by sign is substantially similar to 1.286 (e.g. not deviating more than 5% or 10%), then the predetermined sequence will provide balanced binarization for the set of weights when binarization is performed according to the method of FIGS. 13 and 14. Thus, by determining the ratio of high binary values to low binary weight values in a particular neural network when binarized according to sign of the weights, a sequence of encoding schemes can be designed to approximate that ratio.

While the predetermined sequence in the example of FIG. 17 includes each encoding scheme once in a full cycle, the present disclosure is not limited thereto. For example, the predetermined sequence could include some of the encoding schemes twice or more in a full cycle. For instance, in one example, a predetermined sequence of four encoding schemes may be p1, p1, p2, p2, p3, p4. As long as the combination of selected weight patterns associated with the encoding schemes in a complete cycle of the predetermined sequence has a ratio of high binary values to low binary values substantially equal to the ratio produced by sign-based binarization of the weights for the intended neural network, the binarization will be balanced.

As the encoding schemes and the sequence in which the encoding schemes are applied is predetermined, it is possible for the encoded binary weight values to be decoded easily according to the same sequence of encoding schemes. While in the above examples each group of weights has the same size in other examples, some groups of weights and encoding schemes selected for those groups could have a different size, and decoding will still be possible as long as the group sizes and encoding schemes used are defined according to a predetermined sequence.

The example below shows logic which may be used to encode the groups of weights in one layer of a neural network according to a predetermined sequence of four encoding schemes: p1, p2, p3, p4.

```
G: all groups per layer(4 binary weights
per group)
P: all encoding schemes (= 3)
i = 0
for each group ∈ G do
   if mod(i,3)==0 then
      choose p1;
   else if mod(i,3)==1 then
      choose p2;
   else if mod(i,3)==2 then
      choose p3;
   else then
      choose p4;
   end if
   i = i + 1
   encode the i-th group with the encoding
   scheme chosen above;
end for
```

Figure 18A:
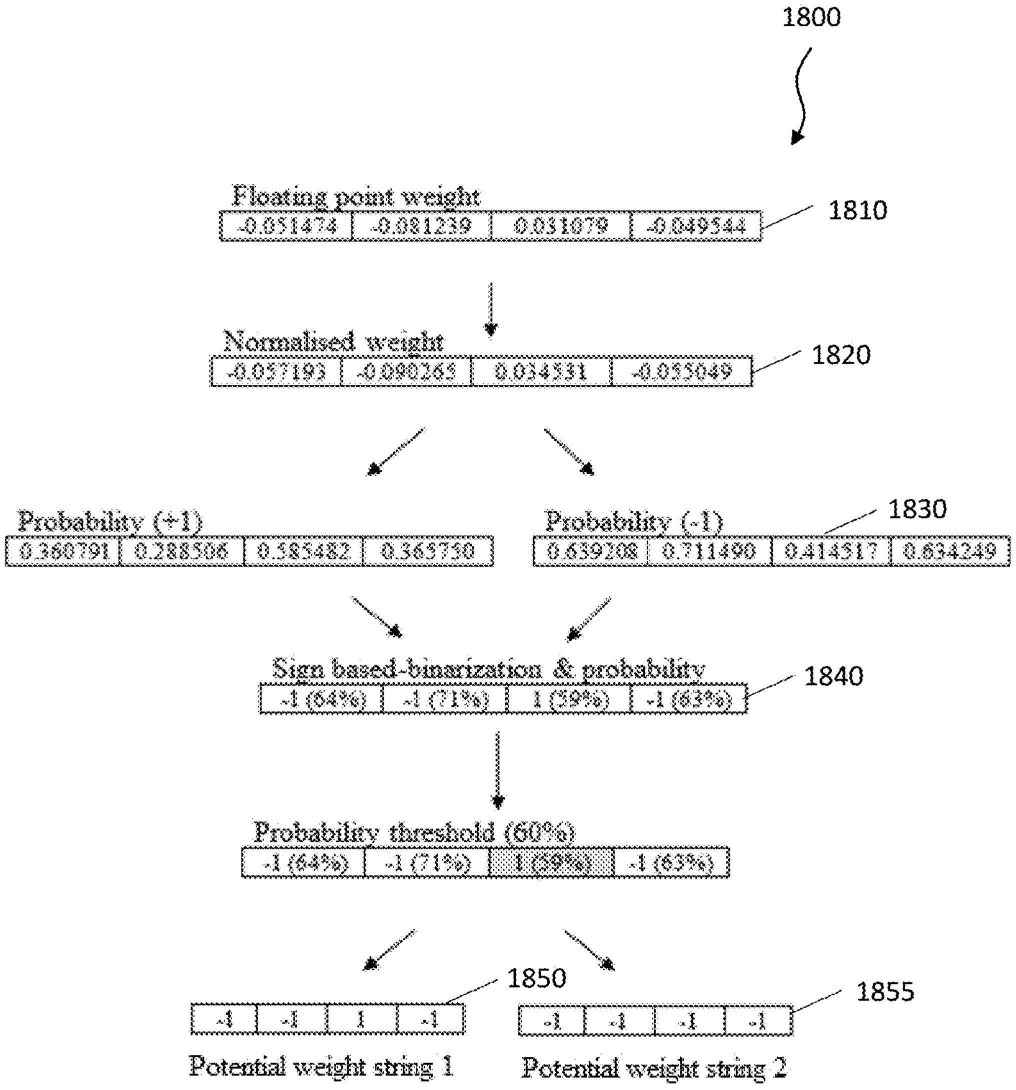
FIG. 18A is a diagrammatic example of a method for generating potential binary weight strings according to a representative embodiment of the present disclosure.
Figure 18B:
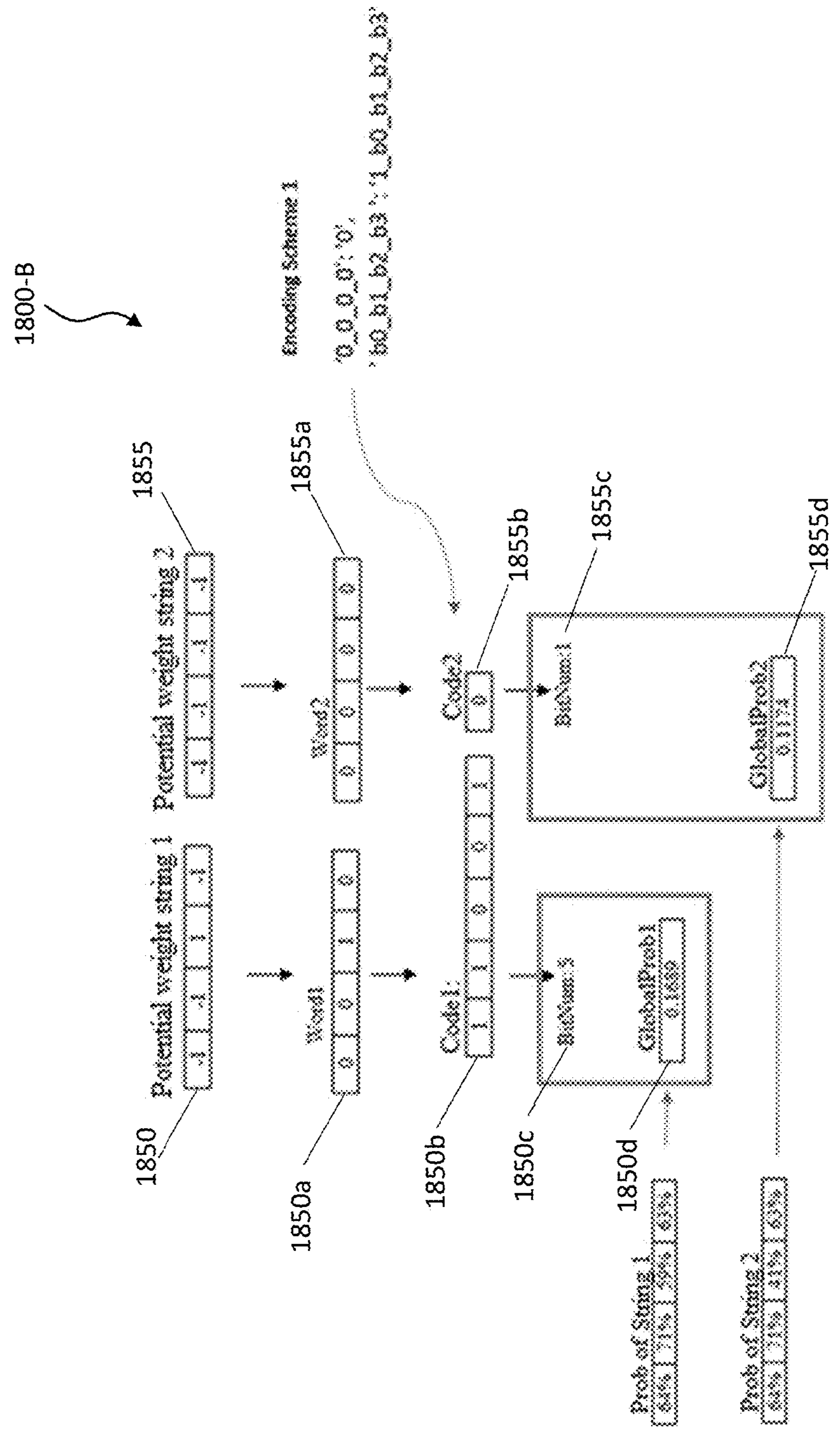
FIG. 18B is a diagrammatic example of a method for selecting a potential binary weight string according to a representative embodiment of the present.
Figure 18C:
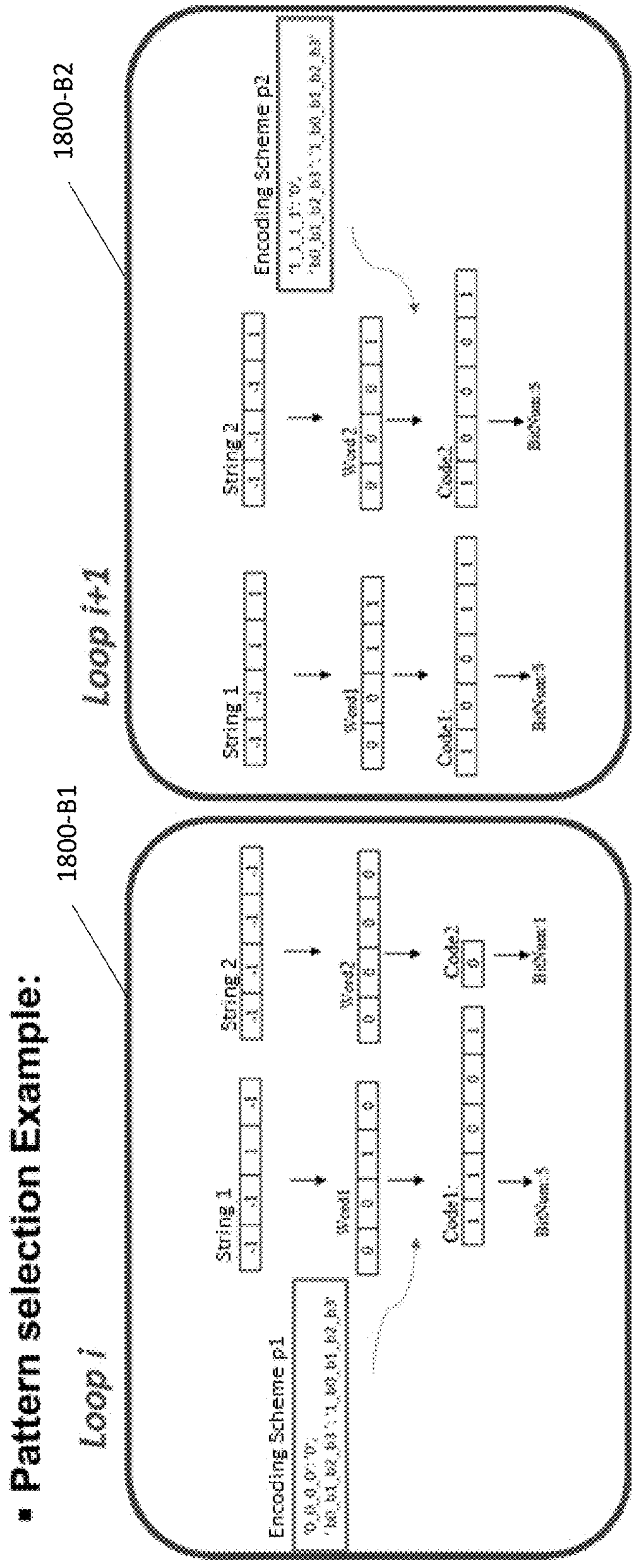
FIG. 18C is a diagrammatic example of a method for selecting a potential binary weight string according to a representative embodiment of the present.

FIGS. 18A to 18C show an example of a binarization method 1800 which uses a plurality of encoding schemes according to a predetermined sequence. FIG. 18A shows generation of a plurality of potential binary weight strings for a group of weights. The binarization method 1800 divides a set of input weights into a plurality of groups of weights, which may be floating point weights. One such group of weights 1810 is shown in FIG. 18A. The floating point weight values may be normalised as shown at 1820. Probabilities of each weight being associated with a particular binary value may be determined as shown at 1830. A sign-based binary value may be determined for each weight based on the normalised weight values and a local probability of each weight having the sign-based binary value may be determined based on the previously determined probabilities for those binary values as shown at 1840.

At 1850 the local probability may be compared to a threshold, in this example 60%. Where the local probability for the sign-based binary value exceeds the threshold, the weight may be assigned the sign-based binary value. Otherwise, the weight may be determined to have an ambiguous binary value which may be adjusted to allow the binary weight string to fit a particular weight pattern. In the example of FIG. 18A, the third weight in the group of input weights as determined to have an ambiguous binary value. As a result two potential binary weight strings 1850 and 1855 are generated for the group of weights 1810. The above steps 1810 to 1850 may be performed according to the teachings in Part 2 of this application. However, in other examples different methods of generating the potential binary weight strings may be used, for instance as discussed in Part 1 of this application.

FIG. 18B shows an example method 1800-B of selecting a binary weight string to represent the group of weights 1810 from among the plurality of potential binary weight strings 1850, 1855 generated in FIG. 18A. The potential binary weight strings may be converted into a form in which high bits are represented by 1 and low bits by 0, as shown at 1850*a* and 1850*b* for the first and second potential binary weight strings respectively.

Next code words 1850*b*, 1855*b* may be generated to represent the first and second potential binary weight string 1850*a*, 1855*a*. The code words 1850*b*, 1855*b* are generated according to an encoding scheme, in this example encoding scheme 1 which is the same as encoding scheme 1 shown in row 4 of Table 5 above. The code word 1850*b* for the first potential binary weight string is 11001 and so the encoding length 1850*c* for the first potential binary weight string is 5 bits. The code word 1855*b* for the second potential binary weight string is 0 and so the encoding length 1855*c* for the second potential binary weight string is 1 bit.

The global probability values 1850*d*, 1855*d* may be calculated for the first and second potential binary weights strings based on the local probability values, as described in Part 2. The global probability values may be taken into account when selecting the binary weight strings, but the inventors found that satisfactory results could be achieved when the selection was based on the encoding length alone. In this example the second binary weight string 0000 may be selected as it has the lowest encoding length.

FIG. 18C shows how the selection process may differ depending on the group number. For example where a plurality of encoding schemes are used according to a predetermined sequence, the encoding scheme applied to a particular group may depend upon the group number. For instance each group of weights may be assigned a group number i, depending on the position of the group within the set of weights being binarized. In the example of FIG. 18C, there are two encoding schemes p1, p2 which correspond to the first and second encoding schemes shown in row 4 of Table 5. The predetermined sequenced may for example apply the encoding schemes in alternating fashion such that the first encoding scheme p1 is applied to group i and the second encoding scheme p2 is applied to group i+1. For instance p1 may be applied to odd group numbers and p2 to even group numbers.

The processing for a group to which the first encoding scheme p1 is applied is shown in 1800-B1 and is the same as FIG. 18B.

The processing for a group to which the second encoding scheme p2 is applied is shown in 1800-B2. In this case the first potential binary weight string is 0011 and the second potential binary weight string is 0001. Neither of these potential binary weight strings match the lowest length encoding pattern of encoding scheme p2, so they are encoded as 10011 and 10001 respectively. The encoding length in each case is 5 bits. In such a case the potential binary weight string may be selected based on other criteria, such as the global probability value (if calculated) or the string which matches the binary weights determined by sign of the input weights may be used.

Figure 19:
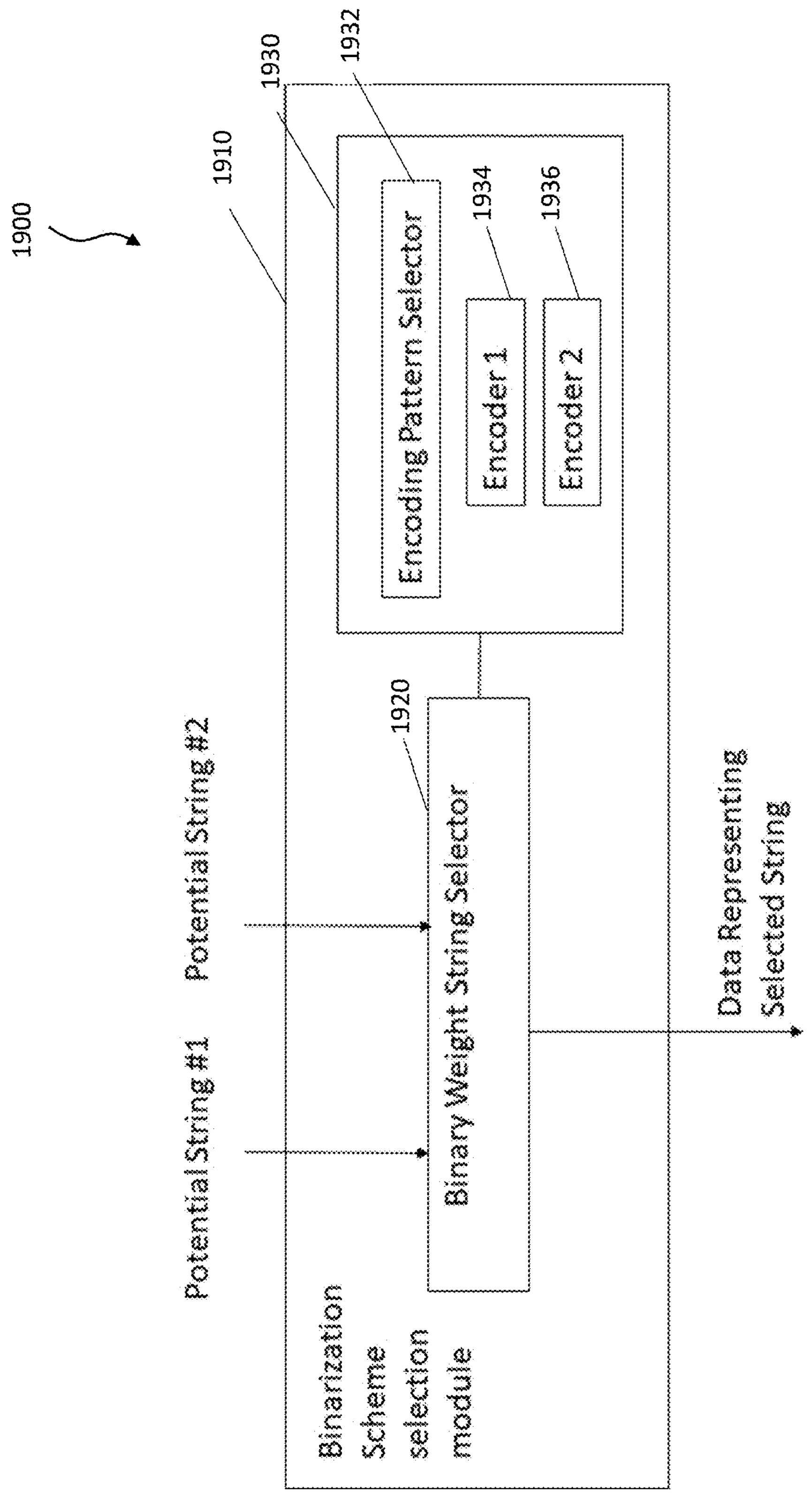
FIG. 19 is a block diagram of an exemplary internal structure of a binarization scheme selection module according to a representative embodiment the present disclosure.

Processors and other logical hardware configured to execute the binarization methods described herein may achieve significant compression of weights for a neural network thus allowing construction of neural networks with fewer memory resources, reducing cost and/or saving power. FIG. 19 shows an example of hardware 1900 configured to implement binarization methods disclosed herein. The hardware comprises a binarization scheme selection module 1910, which may be implemented by a processor or logic circuit. The binarization scheme selection module 1910 comprises a binary weight string selector 1920 which receives at least a first potential binary weight string and a second potential binary weight string. The binary weight string selector 1920 communicates with an encoding module 1930 including at least an encoding pattern selector 1932, a first encoder 1934 for implementing a first encoding scheme and a second encoder 1936 for implementing a second encoding scheme. The encoding module may be implemented by a general purpose processor, look-up table and/or dedicated logic circuitry.

The binary weight string selector 1920 communicates the first and second potential binary weight strings to the encoding module 1930. The encoding module selects one of the at least first encoder 1934 and second encoder 1936 to use based on a predetermined sequence controlled by the encoding pattern selector 1932. The encoding module determines the encoding lengths for each string using the selected encoder. The binary weight string selector then selects a binary weight string based at least in part on the encoding lengths determined by the encoding module. Data representing the selected binary weight string is output by the binarization scheme selection module. The data may comprise the selected binary weight string in original or encoded form.

The description above relates to a binarization method for weights of a neural network, which may for example be used in a training phase of the neural network. The training phase may be carried out on processing devices such as desktop computers, servers or a cloud computing service, which has more resources. However the inference phase, in which the neural network is actually used, may be implemented on resource constrained devices, such as mobile phones, drones, tablet computers, Internet of Things devices etc. Therefore, in order to maximise use of scarce memory resources, the neural network weights may be stored on the inference phase device in encoded (i.e. compressed) form.

Figure 20:
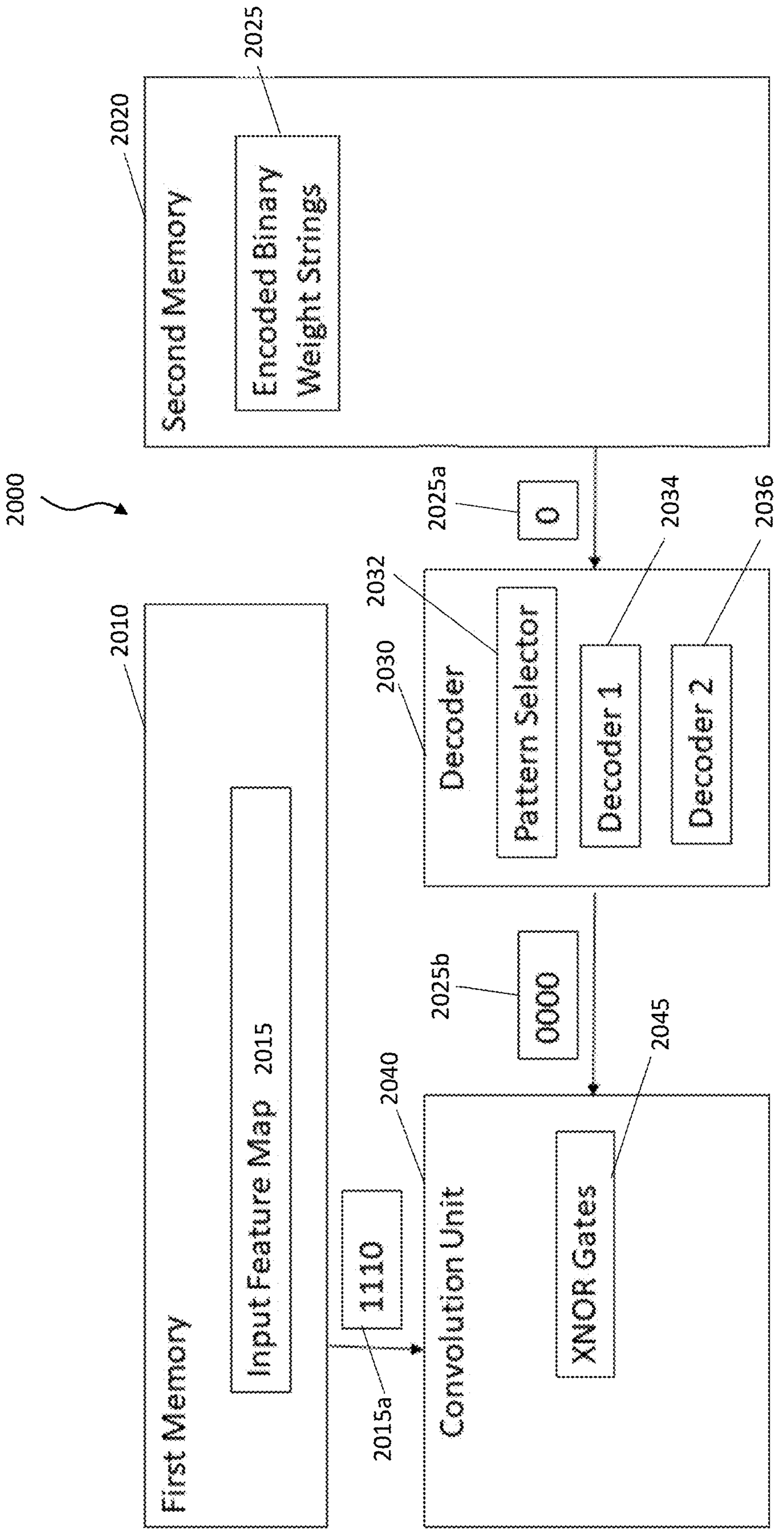
FIG. 20 is a block diagram of an exemplary internal structure of a processing unit for implementing a neural network according to a representative embodiment the present disclosure.

FIG. 20 shows an example of a processing unit 2000 which may be used to implement the inference phase of a neural network.

The processing unit 2000 for implementing a neural network comprises a first memory 2010 for storing an input feature map 2015 and a second memory 2020 for storing encoded binary weight strings 2025 representing binarized weights for use in the neural network. For example the binarized weights may be used in one or more filters of a convolutional layer of the network or as binarized weights in a fully connected layer etc.

The processing unit further comprises a decoder 2030 for decoding the encoded binary weight strings 2025 stored in the second memory 2020 and outputting the decoded binarized filter weights. FIG. 20 shows an example of an encoded binary weight string 2025*a* which the encoder may receive from the second memory. The encoded binary weight string 2025*a* may represent a group of weights to be used in the neural network. FIG. 20 shows how the decoder may output a decoded version 2025*b* of the encoded binary weight string to a convolution unit 2040.

The convolution unit 2040 is configured for performing a convolution operation on an input feature map stored in the first memory (e.g. feature map 2010*a* read from the first memory) with the binarized filter weights 2025*b* output from the decoder. For example, the convolution unit may comprise a number of XNOR gates 2045 for operating on binary values.

The decoder 2030 comprises a plurality of decoding units 2034, 2036. Each decoding unit is configured to decode binary weight strings according to a different encoding schemes, wherein the decoder is configured to switch between the decoding units according to a predetermined sequence. The predetermined sequence may for example be controlled by the pattern selector 2032 which may be implemented by a controller of the decoder 2030.

By storing the binary weight strings representing the convolution network filter weights in encoded form, the processing unit 2000 may conserve memory and power. For a given volume of memory, the processing unit may be able to implement a larger and more complex neural network compared to if encoding was not used. While the encoded weights need to be decoded before convolution, as only some of the weights are operated on at any one time, the use of encoded binary weight strings and a decoder reduces the overall burden on memory resources. Furthermore, as the decoder is configured to use a plurality of encoding schemes according to a predetermined sequence it may decode binary strings even where the encoded data does not indicate the particular encoding method used. Further, as explained above, the predetermined sequence may help to ensure that the data has been binarized and encoded in a way which preserves the accuracy of the neural network despite the high degree of compression. The processing unit may be configured to implement any of the teachings of the present disclosure described above, adapted to a decoding environment. For example, at least some of the decoding units may have unbalanced encoding schemes and the predetermined sequence balances the encoding schemes over a complete cycle of the predetermined sequence. In some examples, each encoding scheme maps a plurality of weight patterns to code words and assigns a shortest length code word to a selected weight pattern, wherein each encoding scheme assigning the shortest length code word to a different weight pattern. In some examples, the predetermined sequence of encoding schemes is such that a ratio of high bits to low bits in the combination of selected weight patterns associated with the encoding schemes in a complete cycle of the predetermined sequence is equal to a predetermined ratio.

While the processing unit described in the example above is a convolutional neural network, the present disclosure is not limited thereto and the same type of decoding arrangement may be used in other types of neural network.

While this disclosure has been described with reference to exemplary embodiments, it will be understood by those skilled in the art that various changes can be made and equivalents may be substituted for elements thereof, without departing from the spirit and scope of the disclosure. In addition, modification may be made to adapt the teachings of the disclosure to particular situations and materials, without departing from the essential scope of the disclosure. Thus, the disclosure is not limited to the particular examples that are disclosed in this specification, but encompasses all embodiments falling within the scope of the appended claims.

What is claimed is:

1. A processor for generating binarized weights for a neural network, wherein the processor is an Application Specific Integrated Circuit (ASIC) or Field-Programmable Gate Array (FPGA) of a small battery-powered device which is a mobile phone, drone, tablet computer, or Internet of Things device, and the processor comprises:

a binarization scheme generation module configured to generate, for a first group of weights taken from a set of input weights for one or more layers of a neural network, potential binary weight strings representing said group of weights; wherein the input weights are floating-point weights, the first group of weights comprises n ambiguous weights and N−n non-ambiguous weights, N being larger than n, and both N and n are positive integers, and the potential binary weight strings are $2^n$ potential binary combinations of the first group of weights;

a binarization scheme selection module configured to select a binary weight string to represent the first group of weights, from among the potential binary weight strings, based at least in part on respective numbers of data bits required to represent the potential binary weight strings according to a predetermined encoding method; and a weight generation module configured to output data representing the selected binary weight string for representing the first group of weights.

2. The processor of claim 1, wherein the potential binary weight strings are generated based on thresholds applied to the input weights or based on probabilities of each weight being associated with a particular binary value.

3. The processor of claim 1, wherein each input weight is determined to correspond to a first binary value, a second binary value or to be an ambiguous weight which may correspond to either of the first and second binary values, wherein the ambiguous weight is an input weight w of the neural network that satisfies $T_{low}<p(w)<T_{high}$, where p(w) denotes a local probability that the input weight w corresponds to the first binary value or the second binary value, $T_{low}$ is a lower probability threshold, and $T_{high}$ is an upper probability threshold.

4. The processor of claim 1, wherein the binarization scheme generation module is further configured to divide the set of input weights into a plurality of groups of weights comprising the first group of weights; and the binarization scheme selection module is further configured to determine, for the first group of weights, encoding lengths for at least two potential binary weight strings for representing the first group of weights according to the predetermined encoding method; and to select a binary weight string to represent the first group of weights, from among the at least two potential binary weight strings, based at least in part on the determined encoding lengths; wherein the predetermined encoding method selects an encoding scheme for each group of weights from among a plurality of encoding schemes according to a predetermined sequence.

5. The processor of claim 4 wherein the plurality of encoding schemes map binary weight patterns to code words and wherein different encoding schemes map at least one same binary weight pattern to different code words.

6. The processor of claim 4 wherein one or more of the plurality of encoding schemes are unbalanced, and the predetermined sequence balances the plurality of encoding schemes over the plurality of groups of weights such that the binarization of the set of input weights is balanced.

7. The processor of claim 6 wherein binary weight strings selected to represent the set groups of input weights according to the unbalanced encoding schemes have a substantially different ratio of high bits to low bits compared to if the binarization had been performed based on signs of the input weights.

8. The processor of claim 6 wherein binarization of the set of input weights is balanced when the binary weight strings selected to represent the set of input weights have a substantially same ratio of high bits to low bits as if the binarization had been performed based on signs of the input weights.

9. The processor of claim 4 wherein each encoding scheme assigns a shortest length code word to a selected weight pattern, each encoding scheme assigning the shortest length code word to a different weight pattern.

10. The processor of claim 9 wherein the predetermined sequence of encoding schemes is such that a ratio of high bits to low bits in selected weight patterns respectively associated with the encoding schemes sequentially selected in a complete cycle of the predetermined sequence is equal to a predetermined ratio.

11. The processor of claim 4 wherein the binarization scheme selection module is configured to select a binary weight string for one group of weights based on encoding lengths determined according to a first encoding scheme and select a binary weight string for another group of weights based on encoding lengths determined according to a second encoding scheme.

12. The processor of claim 4 wherein the encoding method encodes a binary weight string into a fixed length pre-fix and a variable length data section, wherein a value of the pre-fix determines the length of the data section.

13. The processor of claim 12 wherein a first value of pre-fix has a zero length data section and a second value of pre-fix has a data section of length equal to the length of the binary weight string being encoded.

14. The processor of claim 4, wherein the encoding method comprises encoding a binary weight string into a first pre-fix value and no data section if the binary weight string matches a predetermined weight pattern of the selected encoding scheme and otherwise encoding the binary weight string into a second pre-fix value and a data section comprising the binary weight string.

15. A method for binarizing weights for a neural network, comprising performing the following with a processor:

dividing a set of input weights for one or more layers of the neural network into a plurality of groups of weights;

generating, for each group of weights, one or more potential binary weight strings representing the group of weights;

determining, for at least one group of weights, encoding lengths for at least two potential binary weight strings for representing the at least one group of weights according to a predetermined encoding method; and selecting a binary weight string to represent the at least one group of weights, from among the at least two potential binary weight strings, based at least in part on the determined encoding lengths;

wherein the predetermined encoding method selects an encoding scheme for each group of weights from among a plurality of encoding schemes according to a predetermined sequence; and outputting data representing the binary weight string selected to represent the at least one group of weights;

wherein the processor is an Application Specific Integrated Circuit (ASIC) or Field-Programmable Gate Array (FPGA) of a small battery-powered device which is a mobile phone, drone, tablet computer, or Internet of Things device;

wherein the input weights are floating-point weights, each group of weights comprises n ambiguous weights and N−n non-ambiguous weights, N being larger than n, and both N and n are positive integers, wherein the one or more potential binary weight strings for each group of weights are $2^n$ potential binary combinations of said group of weights.

* * * * *